INVENTORS
DUNCAN N. MacDONALD
SEBASTIAN GRABL
BY
ATTORNEYS

April 14, 1970    D. N. MacDONALD ET AL    3,506,814
MARGINAL TEST METHOD AND APPARATUS
Filed June 10, 1965    12 Sheets-Sheet 2

INVENTORS.
DUNCAN N. MacDONALD
SEBASTIAN GRABL
BY
Christie, Parker + Hale
ATTORNEYS.

INVENTORS.
DUNCAN N. MacDONALD
SEBASTIAN GRABL
BY
ATTORNEYS.

INVENTORS.
DUNCAN N. MacDONALD
SEBASTIAN GRABL
BY
Christie, Parker + Hale
ATTORNEYS.

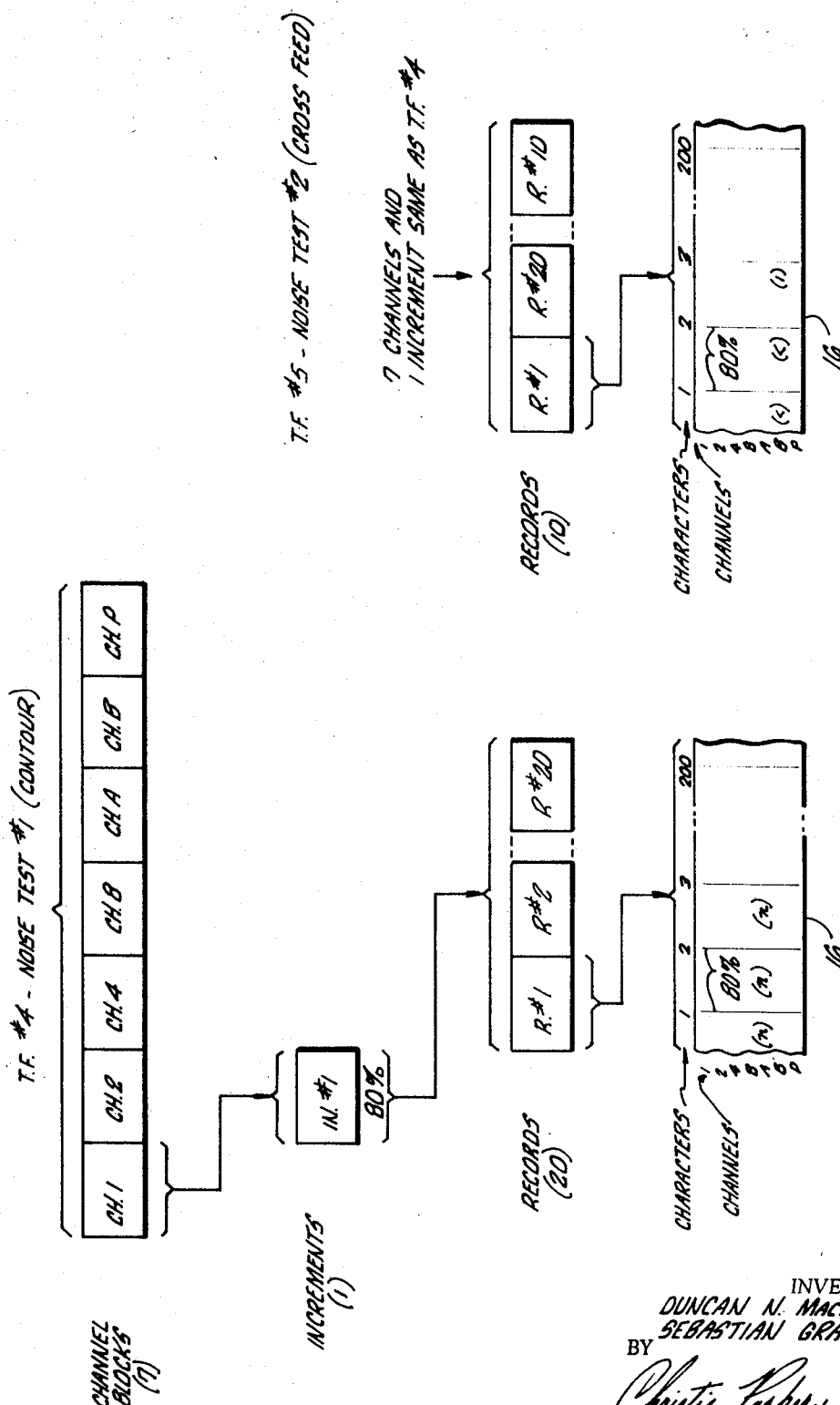

April 14, 1970     D. N. MacDONALD ET AL     3,506,814
MARGINAL TEST METHOD AND APPARATUS
Filed June 10, 1965     12 Sheets-Sheet 6
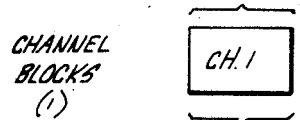
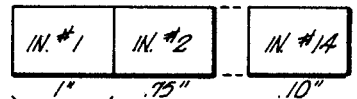
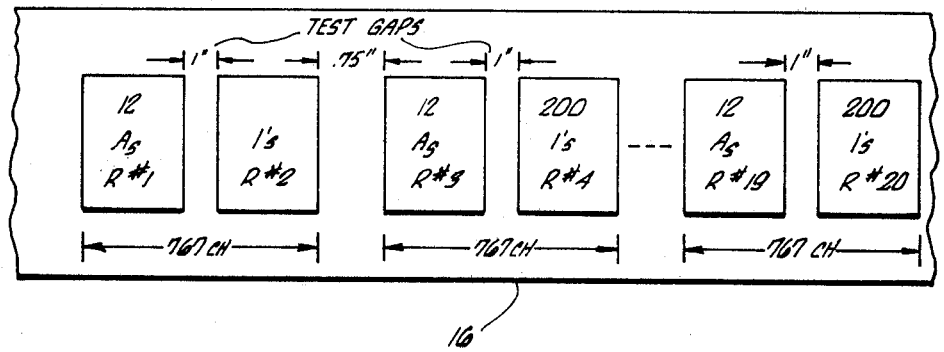
FIG. 10
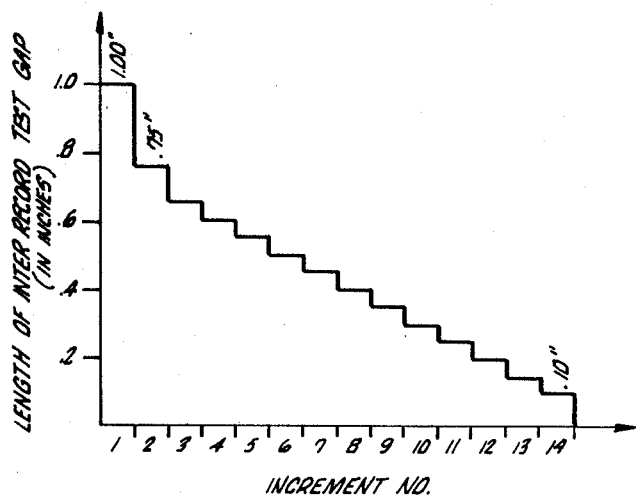
FIG. 11
INVENTORS.
DUNCAN N. MacDONALD
SEBASTIAN GRABL
BY
ATTORNEYS.

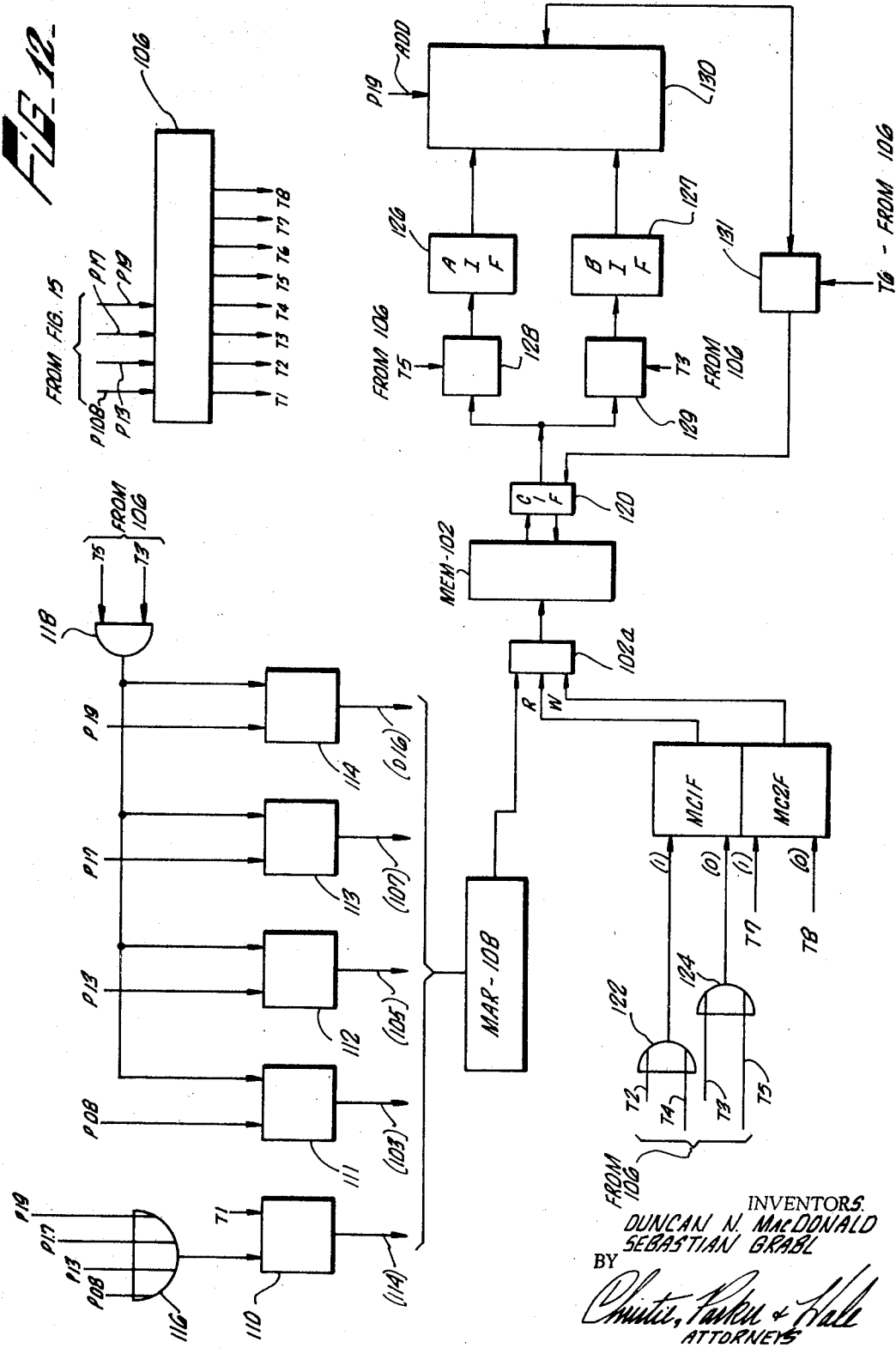

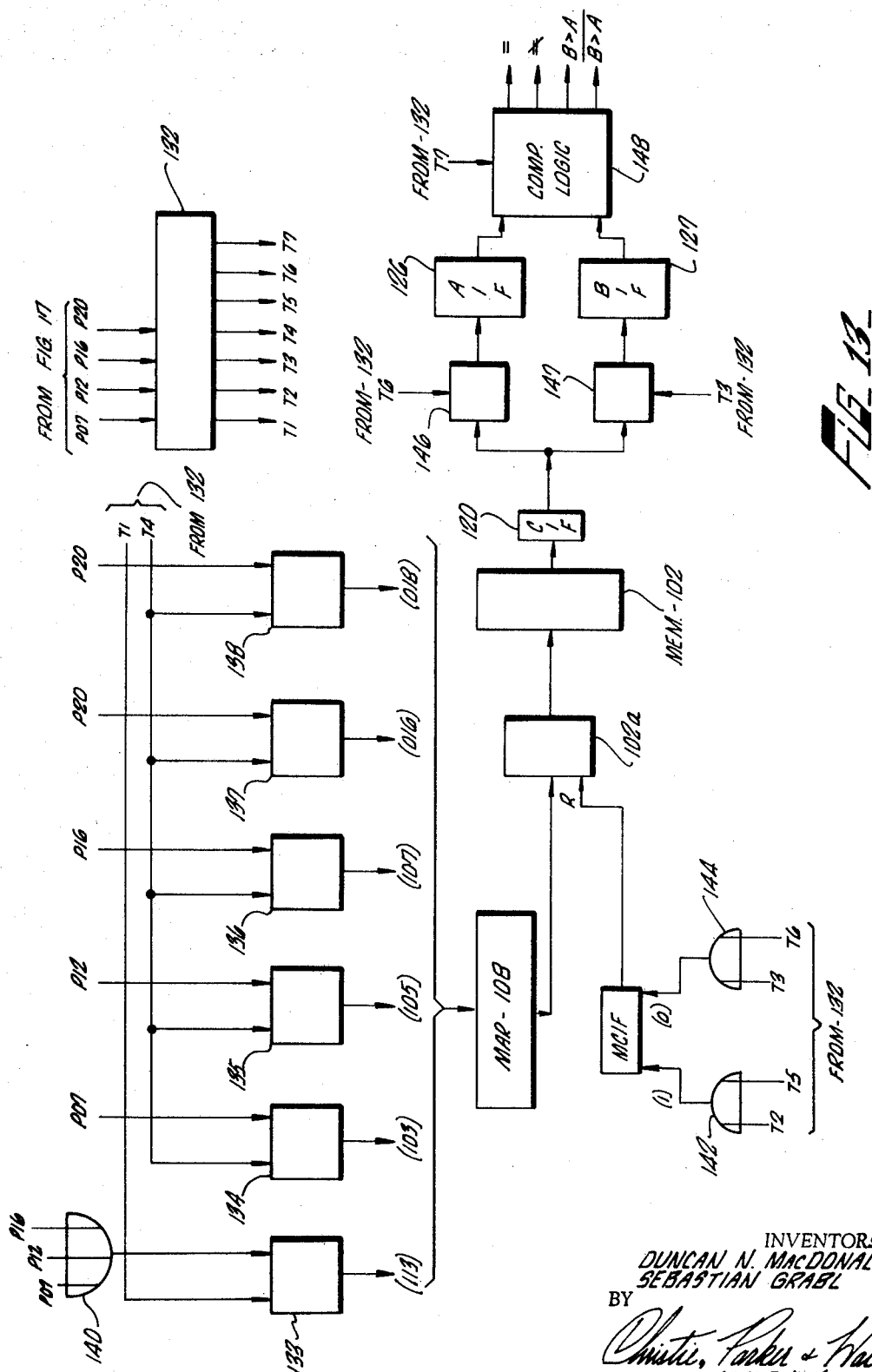

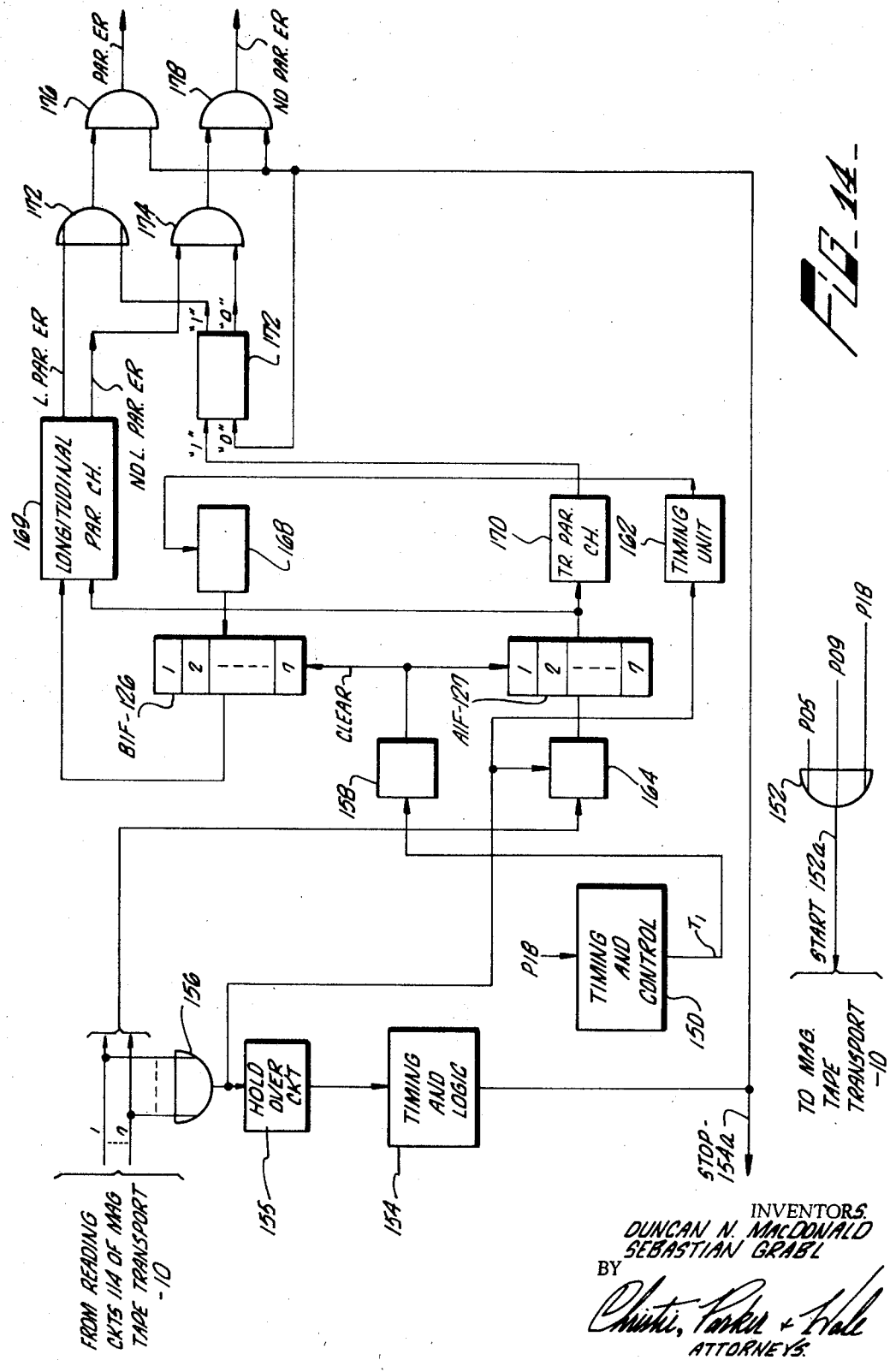

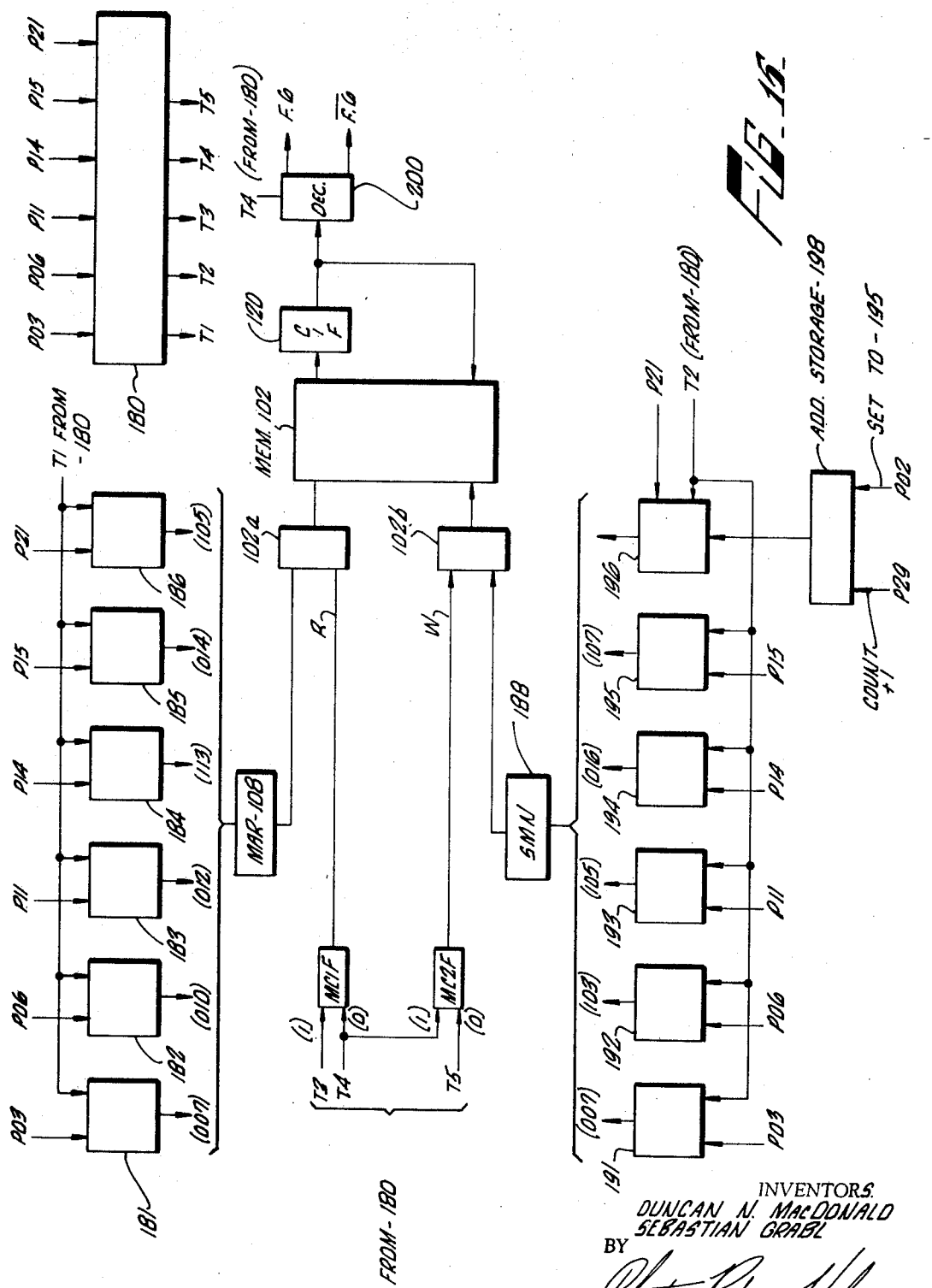

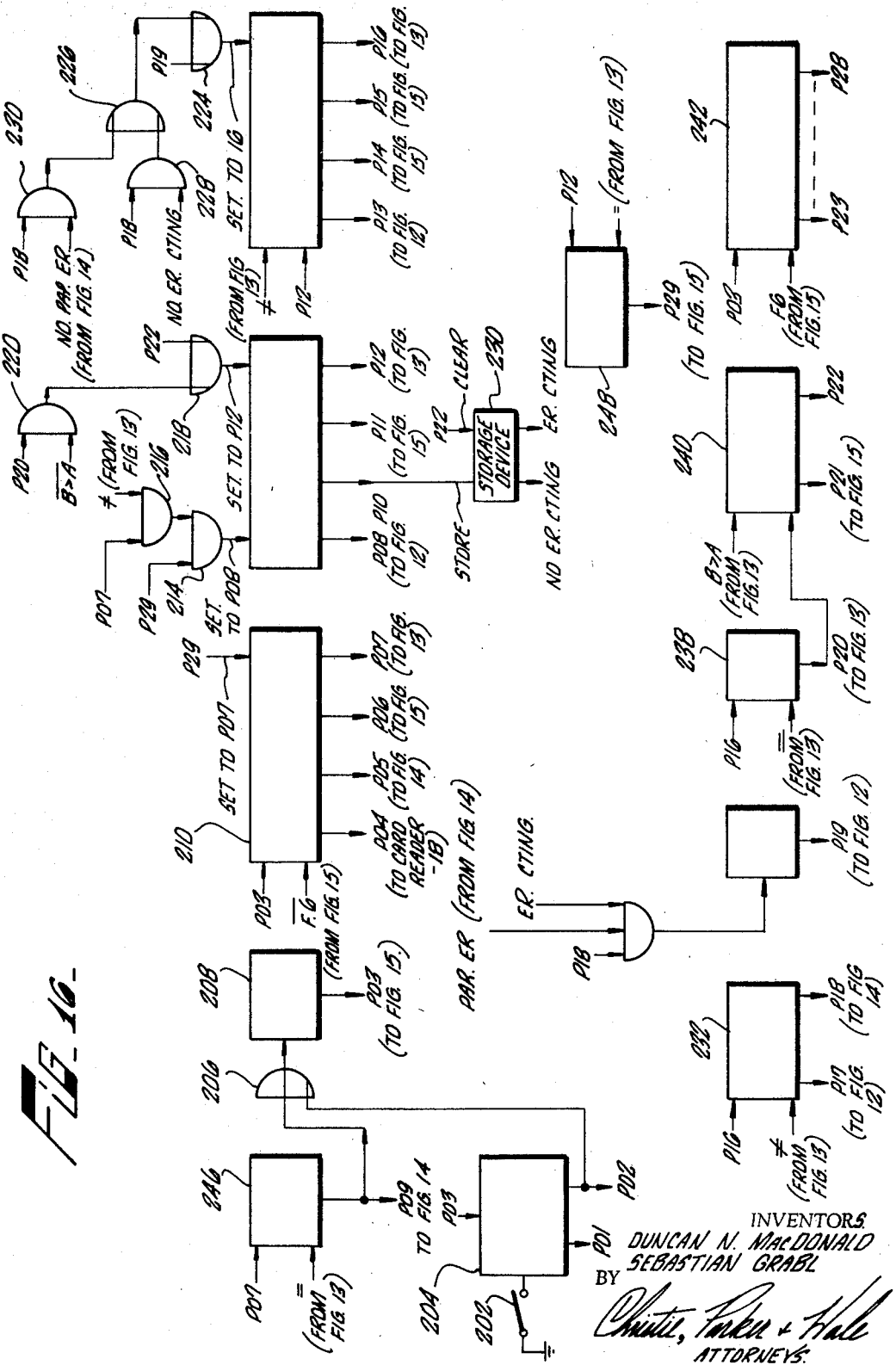

INVENTORS.
DUNCAN N. MacDONALD
SEBASTIAN GRABL
BY
ATTORNEYS.

United States Patent Office 3,506,814
Patented Apr. 14, 1970

3,506,814
MARGINAL TEST METHOD AND APPARATUS
Duncan N. MacDonald, Arcadia, and Sebastian Grabl,
Pasadena, Calif., assignors to Burroughs Corporation,
Detroit, Mich., a corporation of Michigan
Filed June 10, 1965, Ser. No. 462,971
Int. Cl. G06f *11/00;* G11b *5/00;* G01r *15/12*
U.S. Cl. 235—153                                    42 Claims

ABSTRACT OF THE DISCLOSURE

A test record member for a reading apparatus that has serially readable indicia thereon. The indicia is serially and systematically degraded in readability from indicia which can be, to indicia which cannot be, read by the reading apparatus. A digital reading apparatus serially reads such test record member and provides corresponding output signals. A data processing apparatus monitors the signals from the reading apparatus and determines when failure of reading occurs because of the degraded indicia on the record member. A method is disclosed for determining the point of failure of the digital record member reading apparatus using such record member.

---

This invention relates to digital computer systems and more particularly to novel means and method for determining the point of failure of reading apparatus in a digital computer system.

Failures occur in reading apparatus for magnetic tape transports. The failures occur due to failures in components. The complete failure of a component can usually be predicted by a deterioration in the operation of the component. It has been found that by monitoring the reading circuitry for magnetic tape and running marginal checks on the circuitry thereof a degradation of the operating characteristic of the reading apparatus can be detected and complete failure actually predicted before the failure actually occurs. The prediction that a failure is going to occur is very important in modern data processing systems as many of these systems are connected on line in a data processing system or the like and if the failure can be predicted in advance, the particular apparatus involved can be repaired before failure actually occurs and at a convenient time without interrupting the operation of the data processing system.

A number of marginal tests have been performed on magnetic tape reading apparatus to determine if the operating margin is deteriorating. From these marginal tests failure of the reading apparatus is predicted.

One marginal test is the acceptance level test. The acceptance level test is to determine the range in amplitude of signals on tape which the reading apparatus can read properly. The margin for the acceptance level of magnetic tape reading apparatus has been determined by monitoring the output of each channel of the reading apparatus on an oscilloscope while simultaneously reducing the gain of the amplifiers in the channels. The point at which data pulses drop out is noted and the gain of the amplifier at this point is used to determine the margin for the acceptance level.

A second marginal test is one to determine the margin for intra-channel skew and tape guiding skew. The purpose of the intra-channel skew test and tape guiding skew test is to determine the range of displacement of bits on tape which can occur before reading errors occur. Previously, these tests have been performed using an oscilloscope to monitor the output of each channel using delay circuits to simultaneously delay the signals from tape to the amplifiers in the channels. When failure in reading appears on the oscilloscope the setting of the delay circuits is noted and used to determine the operating margin.

The margin for inter-record gap has been measured by monitoring the output of the magnetic tape reading apparatus on an oscilloscope to determine the time for the output signals to rise to a predetermined level after the tape is started in motion. The time for the signal to reach this level is used to determine inter-record gap margin.

Noise sensitivity margins have been determined using a test similar to that for the acceptance level test, except that a bit pattern is selected to provide a worse case type of cross feed noise between channels. The noise sensitivity margin is determined by the bit pattern and gain of the amplifier at the point of failure.

A disadvantage of the foregoing is that the margin is not determined under actual operating conditions. Also time is wasted by an operator monitoring the oscilloscope, etc. Also human error creeps in when determining where failure actually occurs.

In contrast, the present invention encompasses novel means for a digital computer system for determining the operating margins of reading apparatus therein in which no external instrumentation, such as oscilloscopes, is necessary. Also the marginal measurements are made at data processing speed and human error is avoided. Further, a computer system embodying the invention is used to measure its own limitations. Additionally, the marginal testing is made under actual operating conditions.

Briefly, a test record member in accordance with the present invention is arranged in an elongated member having indicia readable by a reading apparatus. The indicia are arranged into transverse rows and longitudinal columns. The columns correspond to channels of the reading apparatus. The indicia are arranged into a series of increments along the length of the elongated member, each increment having a plurality of rows of indicia and the indicia being serially and systematically degraded in readability between rows from one end of said rows of indicia to the other.

Briefly, a method in accordance with the present invention is for determining failure of reading apparatus which reads indicia and provides corresponding digital output signals to digital data processing means using the test record member in accordance with the present invention. The steps comprise placing the test record member in a reading position on the reading apparatus and causing the indicia to be serially read until indicia is reached which cannot be read. The data processing means is controlled so as to monitor the digital signals provided by the reading apparatus to detect an error in the digital signals indicating a failure in reading by the reading apparatus.

Briefly, apparatus in accordance with the present invention is provided by determining the point of failure of a reading apparatus. The apparatus includes a test record member as described above. A data processing means is coupled to the reading apparatus for monitoring the signals therefrom and for detecting an error in reading.

These and other aspects of the present invention will be more fully understood with reference to the following description of the drawings of which:

FIG. 5 is a sketch illustrating the organization of test file #2—intra-channel skew test on the marginal test tape of FIG. 2;

FIG. 8 is a sketch illustrating the organization of test file #4—noise test #1 (contour) on the marginal test tape of FIG. 2:

FIG. 9 is a sketch illustrating the organization of a part of test file #5—noise test #2 (cross feed) on the marginal test tape of FIG. 2;

FIG. 10 is a sketch illustrating the organization of test file #6—interrecord gap on the marginal test tape of FIG. 2;

FIG. 12 is a block diagram showing the combination of elements in the computer of FIG. 1 for incrementing and decrementing;

FIG. 13 is a block diagram showing the combination of elements in the computer of FIG. 1 for comparing;

FIG. 14 is a block diagram showing the combination of elements in the computer of FIG. 1 for causing the magnetic tape unit to read a block of information and for detecting errors in the reading apparatus;

FIG. 15 is a block diagram showing the combination of elements in the computer of FIG. 1 for setting up various constants and other data in the appropriate locations in the memory;

FIG. 16 is a block diagram showing the combination of elements in the computer for controlling the sequence of operation of the circuits of FIGS. 12 through 15.

FIG. 17 is a flow chart illustrating the sequence of operation of the computer system of FIG. 1.

GENERAL DESCRIPTION

Figure 1:
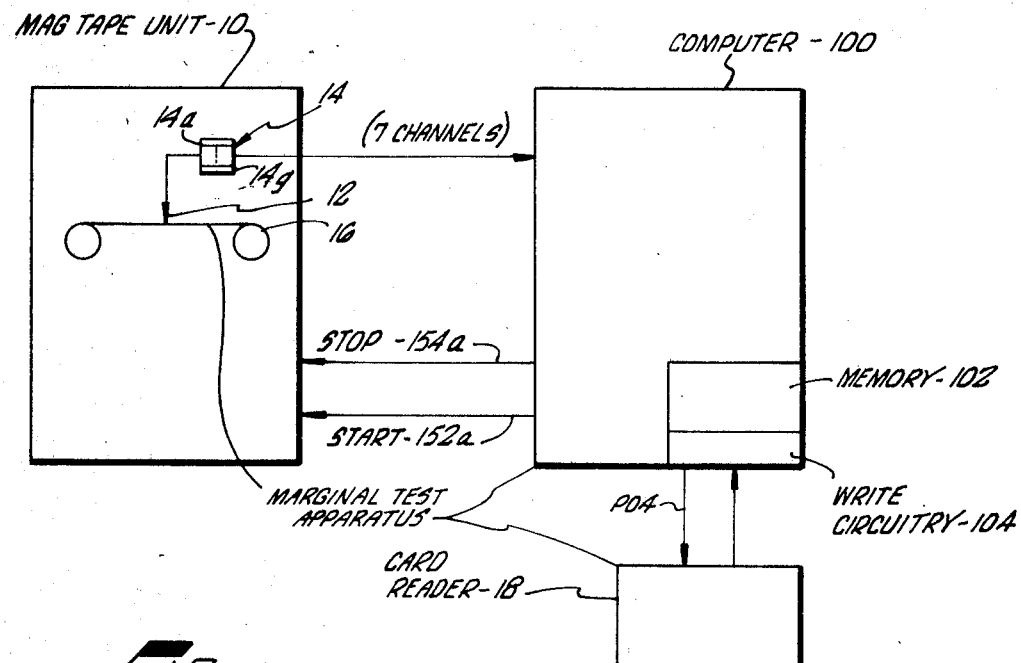
FIG. 1 is a general block diagram of a digital computer system and embodying the present invention.

Consider now the computer system shown in FIG. 1 which embodies the present invention. The magnetic tape transport 10 has a magnetic reading head assembly 12 and reading circuitry 14. A magnetic test tape 16, which is a part of the marginal test apparatus, is mounted in the magnetic tape transport 10. The magnetic reading head assembly 12 has seven individual read heads (not shown) for reading information from seven different channels on the tape 16. The reading circuitry 14 has seven channels of circuitry—14a through 14g, one channel for each one of the seven read heads. Each of channels 14a through 14g has conventional amplifiers, logic, etc., which in combination with the corresponding read head, reads the information from the corresponding channel on tape. The reading circuitry 14 provides seven channels of information to the computer 100.

The purpose of this invention is to test and determine the point of failure and the operating margins of the reading head assembly 12 and the reading circuitry 14 for various amounts of degradation in the readability of the information on the marginal test tape 16.

Figure 2:
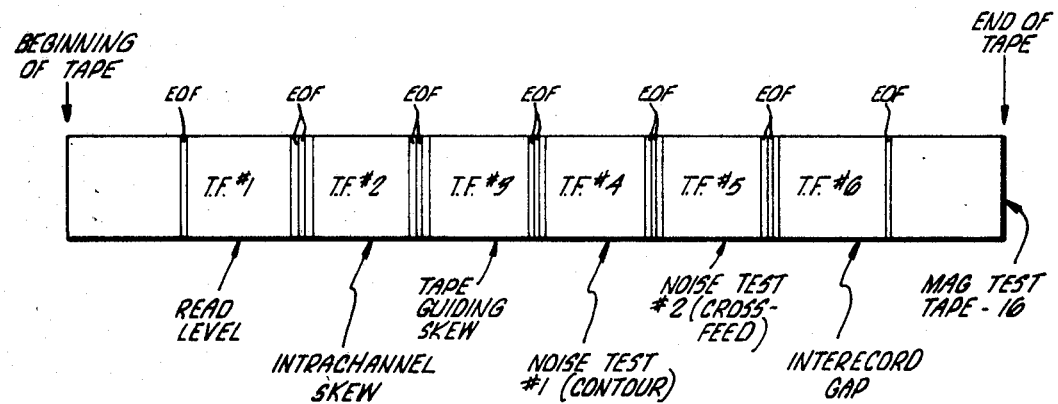
FIG. 2 is a sketch illustrating the organization of the test files on the magnetic test tape of FIG. 1.

Refer now to FIG. 2 which shows the general organization of the test files on the magnetic test tape 16. The novel magnetic test tape 16 has six different test files thereon. The test files are referenced by the symbols T.F.#1 through T.F.#6. Each of the files is preceded and followed by a file mark character represented by the symbol EOF. Thus, in between two adjacent files are two EOF characters. Moving from left to right on the magnetic test tape 16, test files #1 through #6 are for testing the margin of the reading apparatus including the reading circuitry 14 and the reading head assembly 12 for the following margins: read acceptance level, intra-channel skew, tape guiding skew, noise test #1 (contour), noise test #2 (cross feed) and inter-record gap. The information on the tape is in the form of characters. The combination of signals in all seven channels make up a complete character.

It will be explained in detail in a subsequent discussion that each of the test files is broken down into increments with each increment having the readability of the recorded signals reduced a predetermined amount from a desired level. Within each increment there is a plurality of records and all records within the same increment have the readability reduced the same amount.

Referring back to FIG. 1, briefly the marginal test apparatus is arranged for determining the margin for each of the six different tests as follows:

The computer 100 stores information from punched paper cards read by a card reader 18. The information is stored into a memory 102 via write circuitry 104. The computer 100 causes the tape transport 10 to read the increments of each test file of the magnetic test tape 16, a record at a time. The novel internal organization of the computer 100 monitors the information being presented thereto by the read circuitry 14 and keeps track of the increment within a particular file that is being read from the magnetic test tape 16. The parity of each character read from the test tape 16 is checked and when a preselected number of records within one increment are found to be in error a signal corresponding to the increment at which the error occurred is stored in memory 102. The increments are counted and the number of the increment at which failure occurred provides a direct indication of the margin of operation of the reading apparatus 12 and 14 of the magnetic tape unit 10.

The information from the card reader 18 includes constants, which determine the number of increments per file, the number of records per increment and other information described in detail hereinafter.

DETAILED DESCRIPTION OF THE MARGINAL TEST TAPE

Consider the novel marginal test tape 16. Each of the test files of the magnetic test tape 16 (see FIG. 2) has a different type of degradation or reduction in readability of the signal therein. Signals are written on tape in nonreturn to zero form. Consider first the T.F. #1—read acceptance level. The organization T.F. #1 is shown in FIG. 3 and, as indicated, includes seven channel blocks, each block being broken down into eighteen increments and each increment having five records.

Figure 3:
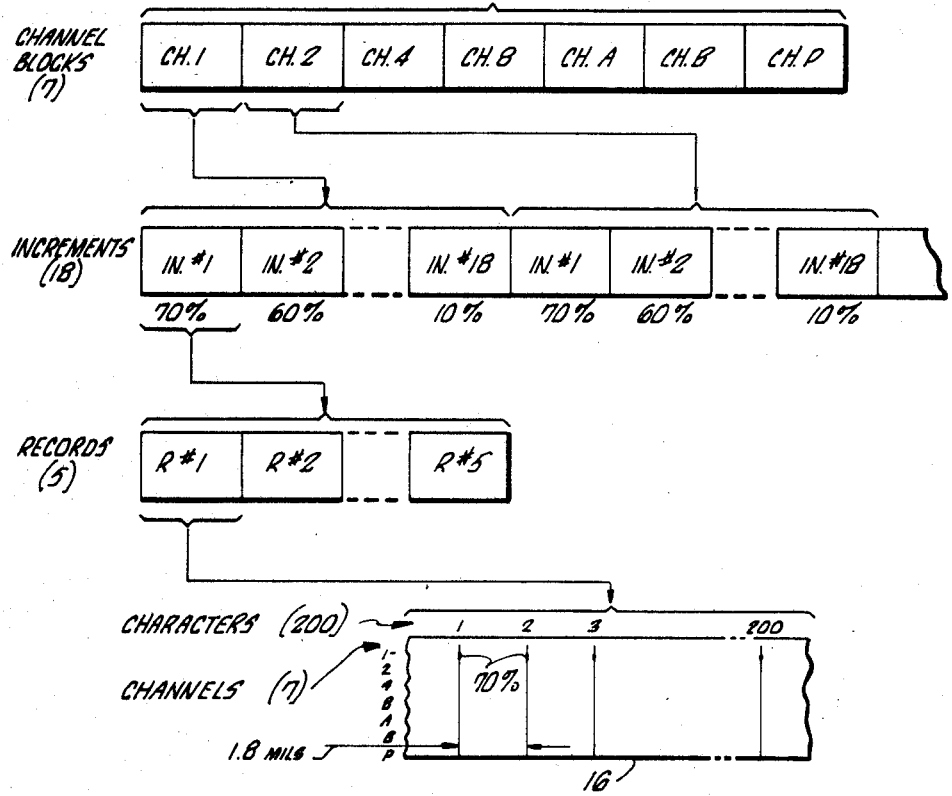
FIG. 3 is a sketch illustrating the organization of test file #1—read acceptance level on the marginal test tape of FIG. 2.

The test tape 16 has seven channels of information along the length thereof which are referred to as channels 1, 2, 4, 8, A, B and P (see the lower part of FIG. 3). Channel P is for a parity bit and is arranged in a conventional manner in the computer art for causing an odd number of one bits to be present in the corresponding row on the tape. Each row on the tape contains a character. Each channel of the reading apparatus 12 and 14 is tested separately. To this end, correspondingly to each of the channels 1, 2, 4, 8, A, B and P, is one of the seven channel blocks referenced by the symbols CH.1, CH.2, CH.4, CH.8, CH.A, CH.B and CH.P. Each of the channel blocks is for performing a margin test on the read apparatus 12 and 14 for the correspondingly numbered channel.

Figure 4:
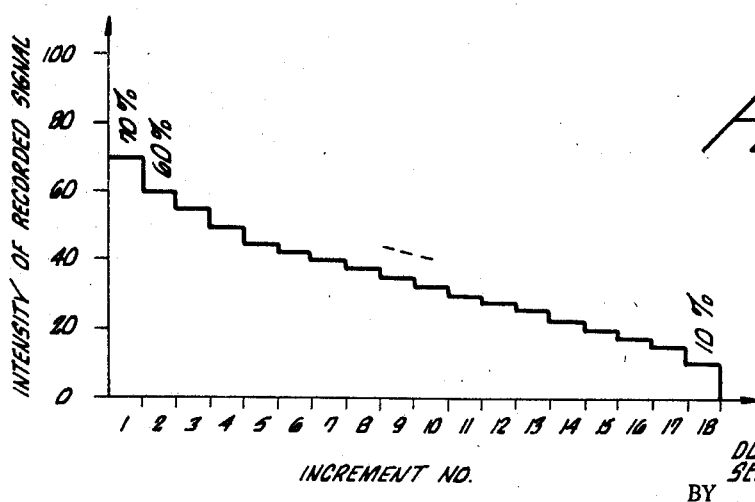
FIG. 4 is a graph showing the percentage of maximum signal intensity for each of the increments shown in FIG. 3 in test file #1.

In T.F. #1 each increment has the magnitude of the signal written on the test tape reduced a predetermined amount from the normal amplitude desired on tape. FIG. 4 is a graph showing the percentage of the normal desired amplitude for each of the increments in T.F. #1. For example, in increment #1 the amplitude of the signal is reduced to a level of 70 percent. In increment #18 the amplitude of the signal is reduced to a level of 10 percent of normal desired signal level.

Each increment has five records and within each record are 200 characters. The purpose of having more than one record in each increment is to eliminate the possibility that a detected error is actually due to a flaw on tape as opposed to a failure in the reading apparatus 12 and 14. To this end, the control and test apparatus is organized so that an error in three different records must occur before a marginal failure is signalled. That is, an error detected in the third record in the same increment is treated as an error due to the reading apparatus 12 and 14.

Tables I through V show the pattern of information in each of the test files. The characters represented in the Information Content Pattern column of Tables I through V and their corresponding combination of "1" and "0" bits in the channels on the test tape are shown in Table VI.

TABLE I.—T.F. #1

| Channel Block | Information Content Pattern | |
|---|---|---|
| CH.1 | 3636 --- | |
| CH.2 | 3535 --- | |
| CH.4 | 6363 --- | |
| CH.8 | Y&Y& --- | Pattern is repeated for 200 characters. |
| CH.A | &-&- --- | |
| CH.B | &Y&Y --- | |
| CH.P | -&-& --- | |

TABLE II.—T.F. #2

| Channel Block | Information Content Pattern | | | | |
|---|---|---|---|---|---|
| CH (+)1, (−)1 | 33 | 3333 | 6666 | 66 | |
| CH (+)2, (−)2 | 66 | 6666 | 5555 | 55 | |
| CH (+)4, (−)4 | 66 | 6666 | 3333 | 33 | |
| CH (+)8, (−)8 | YY | YYYY | &&&& | && | Pattern is repeated for 200 characters. |
| CH (+)A, (−)A | && | &&&& | ---- | -- | |
| CH (+)B, (−)B | && | &&&& | YYYY | YY | |
| CH (+)P, (−)P | -- | ---- | &&&& | && | |

TABLE III.—T.F. #3

| Channel Block | Information Content Pattern | |
|---|---|---|
| CH. +(1), −1 | J --- | Pattern is repeated for 1000 characters. |

TABLE IV.—T.F. #4

| Channel Block | Information Content Pattern | |
|---|---|---|
| CH.1 | n = 3 m = − | |
| CH.2 | n = 3 m = − | |
| CH.4 | n = @ m = 3 | |
| CH.8 | n = @ m = 3 | Pattern is repeated for 231 characters. |
| CH.A | n = & m = 3 | |
| CH.B | n = & m = 3 | |
| CH.P | n = − m = 3 | |

Records are generated by series progression on the following format nmnmmnmmmnmmmm ------------n(hxm) h=1, 2, 3, 4 ------ 20.

TABLE V.—T.F. #5

| Channel Block | Information Content Pattern | |
|---|---|---|
| CH.1 | < < 1 < < 1 | |
| CH.2 | ( ( 2 ( ( 2 | |
| CH.4 | 4 4 | |
| CH.8 | 8 8 | Pattern repeats every 3 characters. |
| CH.A | ≥ ≥ | |
| CH.B | ″ ″ − ″ ″ − | |
| CH.P | [ − − [ − − | |

TABLE VI

| Character: | BCL code P BA 8421 |
|---|---|
| [ | 0 11 1100 |
| ( | 1 11 1101 |
| < | 1 11 1110 |
| & | 0 11 0000 |
| ≤ | 1 10 1111 |
| ≥ | 1 10 0000 |
| ″ | 1 01 1111 |
| @ | 0 00 1100 |
| A | 1 11 0001 |
| J | 0 10 0001 |
| Y | 0 01 1000 |
| 0 | 0 00 1010 |
| 1 | 1 00 0001 |
| 2 | 1 00 0010 |
| 3 | 0 00 0011 |
| 4 | 1 00 0100 |
| 5 | 0 00 0101 |
| 6 | 0 00 0110 |
| 7 | 1 00 0111 |
| 8 | 1 00 1000 |
| 9 | 0 00 1001 |

Referring again to T.F.#1, the information pattern for each channel block of T.F.#1 is shown in Table I. The information pattern which is shown is such that alternate "1" and "0" bits are recorded in the channel on tape under test.

The organization of T.F.#2—intra-channel skew is shown in FIG. 5. As indicated, T.F.#2 is organized into fourteen channel blocks, each channel block having twenty increments and each increment having ten records. T.F.#2 also has two hundred characters in each record and each character is represented by seven channels on tape (channels 1, 2, 4, 8, A, B, P).

The purpose of the intra-channel skew (T.F.#2) is to determine the amount by which a signal recorded in each channel can be displayed with respect to the rest of the signals in the corresponding row before failure of the reading apparatus occurs. The intra-channel skew tests for displacements in both the forward and reverse directions with respect to the rest of the row of signals on tape. Thus, with reference to FIG. 5, it will be noted that channel block CH.(+)1 indicates a pulse displacement in a forward direction, whereas, CH.(−)1 indicates a pulse displacement in the opposite direction in channel 1. The "+" and "−" directions are indicated at the lower part of FIG. 5. Similar channel blocks are provided for channels 2, 4, 8, A, B and P. The increments in each channel block have pulse displacements ranging from 4 microseconds to 9.7 microseconds with respect to the other signals in the corresponding row. The pulse displacement in seconds is measured at a tape speed of 90 inches per second at a bit density of 556 bits per inch. Thus, in increment #1 the displacement is 4 microseconds, whereas, in increment #20, the displacement is 9.7 microseconds.

Table II shows the information pattern for each channel block of T.F. #2. The pattern is selected so that each channel on tape is tested separately.

Figure 6:
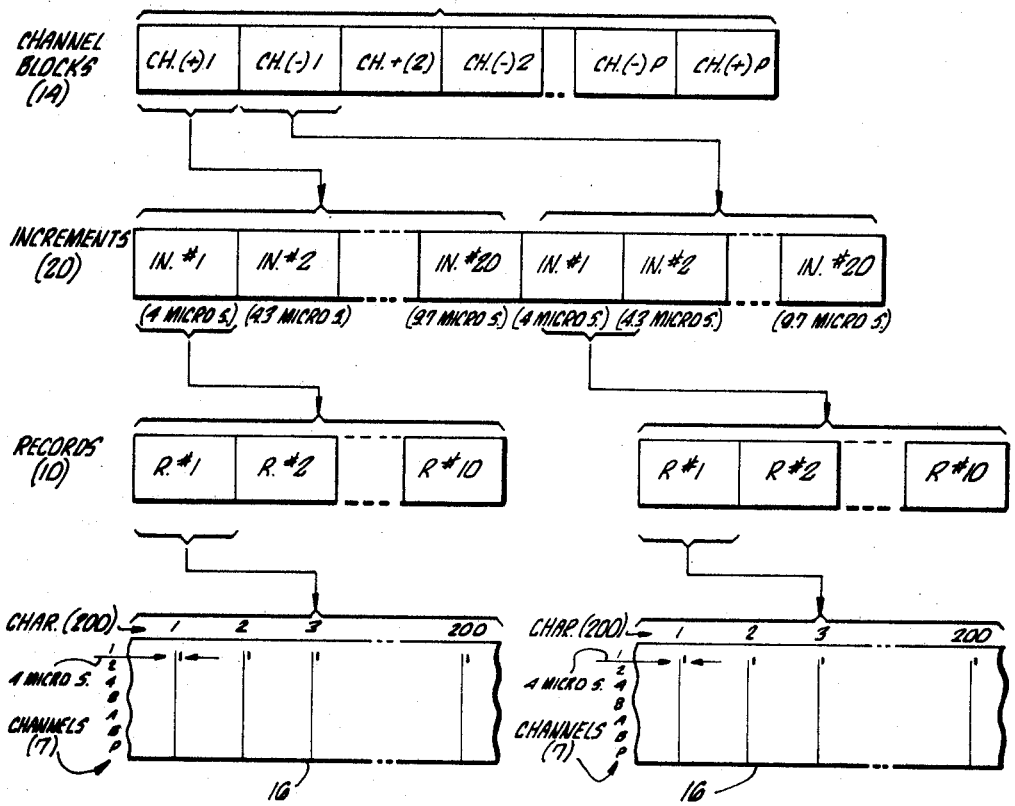
FIG. 6 is a sketch illustrating the organization of test fiile #3—tape guiding skew on the marginal test tape of FIG. 2.

The organization of T.F.#3—tape guiding skew is shown in FIG. 6. As indicated in FIG. 6, T.F.#3 has two channel blocks, each channel block having twenty increments, each increment having thirty records and each record containing two hundred characters. Each character is represented by seven channels on tape similar to T.F.#1 (i.e. channels 1, 2, 4, 8, A, B, P).

The purpose of the tape guiding skew test (T.F.#3) is to determine the amount by which the bits at opposite edges of the tape can be displaced with respect to the rest of the row before an error in reading by the reading apparatus occurs. With reference to the bottom of FIG. 6, it will be noted that in CH.(+)1 the signal in channel 1 is displaced to the left of the row, whereas, the bit in channel B is displaced to the right of the row. Only channels 1 and B are used for the tape guiding skew margin test. Channel block CH.(+)1 is for determining the point of failure for displacement in the direction shown at the left in the bottom of FIG. 6 with the bit in channel 1 displaced to the left, whereas, channel block CH(−)1 is for determining the point of failure for a pulse displacement to the right in channel 1 as shown at the bottom right-hand side of FIG. 6.

Figure 7:
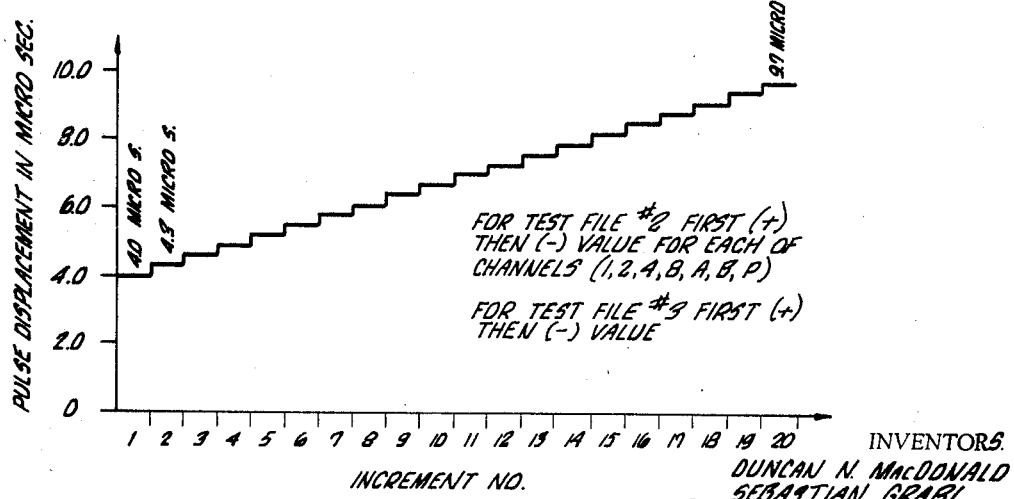
FIG. 7 is a graph illustrating the pulse displacement for each of the increments shown in FIGS. 5 and 6 in test files #2 and #3.
Figure 6:
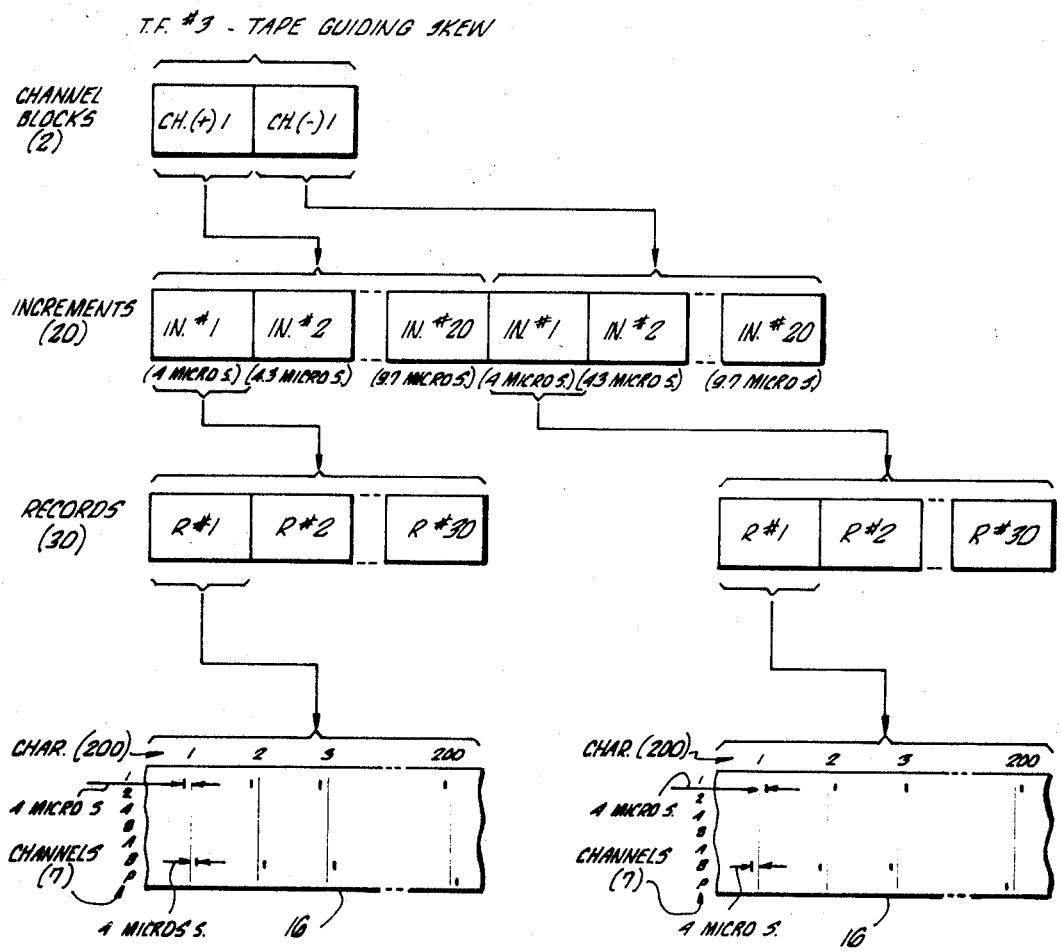

Table III shows the information pattern for T.F.#3. FIG. 7 shows the displacement for each of the increments for T.F.#3 as well as T.F.#2. As indicated, the displacement in increment #1 is 4 microseconds, whereas, displacement in increment #20 is 9.7 microseconds, for both T.F.#2 and T.F.#3.

Thus, the readability of signals in T.F.#2 and T.F.#3 is reduced from increment to increment, similar in purpose to T.F.#1.

FIG. 8 shows the organization of T.F.#4—noise test #1 (contour). T.F.#1 has a combination of signals in the records which cause a maximum amount of cross talk between channels of the reading apparatus 12 and 14 due to the particular contour, shape and dimensions of the read and write heads in the reading head assembly 12.

In the T.F.#4 as in T.F.#1 there are seven channel blocks but each channel block has only one increment. The information pattern along the length of the increment of T.F.#4 is shown in Table IV. Each channel block has a different information pattern as shown in Table IV. The reason is that the information pattern for each channel block is chosen to test the channel of the reading apparatus corresponding to the channel block. The signals in T.F.#4 are reduced in magnitude to 80 percent of normal desired signal level. The increment has twenty records composed of twenty characters each. Similar to T.F.#1 each character has seven channels on tape (i.e. channels 1, 2, 4, 8, A, B, P).

Thus, T.F.#4 has a single increment with the readability reduced due to a reduction in signal level and due to the information pattern.

The T.F.#5—noise test (cross feed) organization is partially shown in FIG. 9. T.F.#5 is similar to T.F.#4 except that there are only ten records rather than twenty and the information pattern for each channel block is shown in Table V. Again the translation for Table V is shown in Table VI.

The purpose of the cross feed noise test is to determine the point of failure of the reading apparatus 12 and 14 with the amplitude of the signal on the tape cut to 80 percent of the normal desired level and with the information pattern on tape selected for a worse case situation for signal cross feed between channels of the reading apparatus 12 and 14.

The information pattern for each channel block of T.F.#5 is selected, in accordance with Table V to test one of the channels of the reading apparatus.

FIG. 10 shows the organization for T.F.#6—inter-record gap. The purpose of the inter-record gap test is to determine the amount of spacing between records at which the reading apparatus 12 and 14 fail. As indicated in FIG. 10, the T.F.#6 has one channel block having fourteen increments, with each increment having twenty records.

The records are organized into pairs, i.e. R#1 and R#2 form a pair of records. Each pair of records is separated by a record test gap. Also each pair of records is separated by a normal inter-record gap of .75 inch. The first record of each pair has twelve "A" characters recorded therein. The combination of the bits of an "A" character is shown in Table VI. The second record of each pair has a variable number of "1" characters (see Table VI) recorded therein. The distance across the inter-record gap can be measured in terms of the number of characters that can be recorded therein at the same spacing as is normally used on the magnetic tape. The total number of characters in each pair of records, including the space for the test gap in between, is equivalent to 767 characters. Therefore, as the test gap decreases in size, the number of "1" characters in the second record of the record pair increases. In this manner the distance between the beginning and the end of each pair of records is the same.

FIG. 12 shows the length of the inter-record test gap in each increment of T.F.#6. As indicated, the inter-record test gap varies from a gap of 1 inch in increment #1 to a gap of .10 inch in increment #14. Thus, the readability of the information in T.F.#6 is reduced from increment to increment.

It should be noted that magnetic tape unit and its reading heads and circuitry are only one type of reading apparatus which can be tested in accordance with the present invention. For example, other devices with reading apparatus for reading other types of record members can be tested within the scope of the present invention. Examples of such reading apparatus and record members include magnetic disk files and magnetically recorded disks, card readers and punched paper cards, magnetic ink character reading devices and documents with magnetic ink characters thereon, paper tape reading devices and punched paper tape, magnetic drum reading apparatus and magnetic drums. The aforegoing list is not meant to include all reading devices and the corresponding record members which could be used within the scope of the present invention but is provided by way of example. The indicia on the record members listed by way of example and others may have part of the indicia thereon degraded in readability. For example, punched paper cards and punched paper tape may have increasing occlusion of the openings therein along the lengths thereof, or the openings may be skewed or one or more openings in each row displaced with respect to the rest of the row. It should be understood that the present invention is not limited to the margin tests #1 through #6 but other margin tests can be devised for degrading the readability of the indicia on the record member in other ways.

DETAILS OF THE COMPUTER

Consider now the details of the marginal test apparatus contained in the computer 100 as it is shown in FIG. 12 through 16. The computer 100 is arranged in a novel combination for determining the margin of failure of each of the different types of tests described hereinabove. The novel combination is broken down according to the various operations of the marginal test apparatus into individual FIGS. 12 through 16.

During the first part of operation of the marginal test apparatus the card reader 18 is caused to read constants from punched paper cards. These constants are stored into memory locations referenced by the symbols 007, 010, 012, 014, 018, 113 and 114 under control of the write circuitry 104. A different set of constants are stored into the aforementioned memory locations for each of the test files. The constants stored in the above-noted memory locations of the memory for each test file is shown in Table VII.

It should be noted, however, some or all of these constants may be stored elsewhere in memory and shifted to those locations using conventional data processing techniques.

TABLE VII

| Memory Location | Description of Information | Constants from Card | | | | | |
|---|---|---|---|---|---|---|---|
| | | T.F.#1 | T.F.#2 | T.F.#3 | T.F.#4 | T.F.#5 | T.F.#6 |
| 007 | File number from card | 1 | 2 | 3 | 4 | 5 | 6 |
| 010 | Channel talley from card | 7 | 14 | 2 | 7 | 7 | 1 |
| 012 | Increment tally from card | 18 | 20 | 20 | 1 | 1 | 14 |
| 014 | Record tally from card | 4 | 10 | 30 | 20 | 10 | 20 |
| 016 | Error tally | — | — | — | — | — | — |
| 018 | Error limit from card | 2 | 5 | 15 | 10 | 5 | 5 |
| 103 | For channel tally | — | — | — | — | — | — |
| 105 | For increment tally | — | — | — | — | — | — |
| 107 | For record tally | — | — | — | — | — | — |
| 113 | Constant 0 from card | 0 | 09 | 0 | 0 | 0 | 0 |
| 114 | Constant 1 from card | 1 | 1 | 1 | 1 | 1 | 1 |
| 915 | For result storage | — | — | — | — | — | — |

Consider the portion of the computer 100 shown in block diagram form in FIG. 12. The memory 102 shown in FIG. 1 is shown again in FIG. 12 for purposes of explanation. The memory is a conventional magnetic core memory which reads and writes a character at a time. Each character has seven binary coded bits. Each memory location in the memory 102 stores a character of information.

Also shown in FIG. 12 is computer timing and control unit 106 having inputs from the output circuits P08, P13, P17 and P19 of the computer control circuits 100 shown in FIG. 16. The computer timing and control unit 106 forms timing pulses at output circuits T1 through T8, in sequence, upon receiving a control signal at any one of its input circuits.

A memory address register 108 is provided for addressing the memory 102. The memory address register 108 has conventional flip-flop circuits for storing addresses designating various memory locations in the memory 102. Connected to the memory address register 108 are control and gating units 110 through 114. The control and gating unit 110 stores the address 114 into the memory address register 108 in response to the combination of a control signal from an OR gate 116 and from the output T1 from the timing and control unit 106. Similarly, the control and gating units 111, 112, 113 and 114 are arranged for storing addresses 103, 105, 107 and 016, respectively, into the memory address register 108 in response to the indicated control signals applied thereto.

The OR gate 116 has inputs connected to the output circuits P08, P13, P17 and P19 of FIG. 16. Each of the control and gating units 111 through 114 have a control circuit connected to an AND gate 118 and another input circuit connected to one of the output circuits from FIG. 16. The control and gating units 111 through 114 have their other control circuits connected to the output circuits P08, P13, P17 and P19, respectively, of the computer control in FIG. 16. The AND gate 118 has its input circuits connected to T5 and T3 from 106.

A memory read and write control circuit 102a is provided for reading and writing in the memory locations of the memory 102 specified by the address contained in the memory address register 108. The memory read and write control circuit 102a is a conventional read and write circuit arranged for reading out a character composed of seven binary coded bits for storage in a CIF information register 120 and is also arranged for writing a character composed of seven binary coded bits from the CIF information register 120 back into the memory location of the memory 102 designated by the memory address register 108. The read and write control circuit 102a is also arranged in a conventional manner for writing a character back into the same memory location from which it is read and thereby prevent the loss of information from memory.

The memory read and write control circuit 102a reads or writes depending on the state of two control flip-flops MC1F and MC2F. When the MC1F flip-flop is in a "1" state, the memory read and write control circuit 102a causes a read operation, whereas, when the MC2F flip-flop is in a "1" state, the memory read and write control circuit causes the write operation. An OR gate 122 is responsive to a control signal from either T2 or T4 from 106 for setting the MC1F flip-flop into a "1" state. An OR gate 124 is responsive to a control signal from either the T3 or T5 output circuit from 106 for setting the MC1F flip-flop into a "0" state. A control signal at the T7 and T8 output circuits from 106 causes the MC2F flip-flop to be set into a "1" state and a "0" state, respectively.

An AIF register 126 and a BIF register 127 is provided for storing characters read out of the memory 102 and stored in the CIF register 120. A gate 128 is arranged for storing a character from the CIF register 120 into the AIF register 126 in response to a control signal at the T5 output from 106. A gate 129 is arranged for storing a character from the CIF register 120 into the BIF register 127 in response to a control signal at the T3 output from 106.

An adder circuit 130 is coupled to the AIF and BIF registers 126 and 127. The adder 130 is a conventional adder circuit for normally subtracting a character in the BIF register 127 from a character in the AIF register 126 and for forming a corresponding output signal at the output thereof. A gate 131 stores a character into the CIF register 120 corresponding to the output of the adder 130 in response to a control signal at the T6 output from 106.

The adder circuit 130 is also arranged in response to a control signal at the P19 output from FIG. 16 for adding the contents of the AIF and BIF registers 126 and 127 together, rather than subtracting.

Refer now to FIG. 13. FIG. 13 shows a block diagram of the portion of the computer 100 for determining whether two characters are equal, not equal, and whether one is larger than the other. The apparatus shown in FIG. 13 includes some of the same apparatus shown in FIG. 12 and FIG. 1 and is shown again for purposes of explanation. The circuits shown over again in FIG. 13 are the memory address register 108, the memory 102, the memory read and write control circuit 102a, the CIF register 120, the AIF register 126, the BIF register 127 and the MC1F flip-flop.

Also included in FIG. 13 is a timing and control unit 132. The timing and control unit 132 is quite similar to the timing and control unit 106 of FIG. 12 but has its inputs connected to outputs P07, P12, P16 and P20 of FIG. 16. The timing and control 132 has outputs T1 through T7 at which control signals are applied, in sequence, in response to a control signal at any one of its input circuits.

Similar in operation and function to 110 through 114 of FIG. 12, control and gating units 133 through 138 are provided for storing various addresses into the memory address register 108. The control and gating units 133, 134, 135, 136, 137 and 138 are arranged for storing the addresses 113, 103, 105, 107, 016, and 118, respectively, into the memory address register 108 in response to a simultaneous control signal at each of their two input circuits. The control and gating units 134, 135, 136 and 138 have one input connected to the output T4 from 132, whereas, the timing and control units 133 and 137 have one input connected to the output T1 from 132. The other input of each of the control and gating units 133 through 138 have an input connected to the output of an OR gate 140 and the outputs P07, P12, P16 and P20, respectively, from FIG. 16.

The OR gate 140 has input circuits connected to the outputs P7, P12 and P16 of FIG. 16. The MC1F flip-flop has its inputs for setting it into "1" and "0" states connected to OR gates 142 and 144, respectively. The OR gate 142 sets the MC1F flip-flop into a "1" state in response to a control signal from either the T2 or T5 output from 132. The OR gate 144 sets the MC1F flip-flop into a "1" state in response to either the T3 or T6 output from 132.

A gate 146 stores a character contained in the CIF register 120 into the AIF register 126 in response to a control signal at T6 from 132. A gate 146 stores a character contained in the CIF register 120 into the BIF register 127 in response to a control signal at the T3 output from 132.

A compare logic unit 148 is coupled to the AIF and BIF registers 126 and 127 and provides a control signal at an output circuits, reference by the symbol =, when the content of the two registers is equal, provides a control signal at an output, referenced by the symbol ≠, when the contents of the two registers are not equal, provides a control signal at an output circuit, referenced by the symbol $B>A$, when the content of the BIF register 127 is greater than the content of the AIF register 126 and provides a control signal at an output referenced by the symbol $\overline{B>A}$ when the content of BIF is not greater than the content of AIF.

FIG. 14 shows a block diagram of the portion of the computer 100 for causing the magnetic tape transport 10 to read a record of information from tape and for detecting both longitudinal and transverse parity errors of the information coming from tape. The apparatus shown in FIG. 14 includes a timing and control unit 150. The timing and control unit 150 forms a control pulse at output circuit T1 in response to a control signal from T18 of FIG. 16.

An OR gate 152 applies a start signal at an output circuit 152a in response to a control signal from output P05 or P09 or P18 from FIG. 16. The output circuit 152a is connected to the magnetic tape transport 10. A control signal at 152a causes the magnetic tape transport 10 to read from tape until a control signal is applied to the stop output circuit 154a.

The stop output circuit 154a is connected to the output circuit of a timing and logic circuit 154 having an input circuit connected to a holdover circuit 155. The holdover circuit 155 is connected to a gating circuit 156 having its input circuits connected to the seven output circuits of read circuitry 14 in the magnetic tape transport 10. The holdover circuit 155 is a conventional electronic timing circuit which is arranged for applying a control signal to the timing and logic circuit 154 for a predetermined time interval following the termination of a control signal at its input circuit from the gate 156. There is always a pulse in at least one channel or tape which causes on output signal from the tape transport 10 for each character or tape. A pulse in any channel or tape causes the gate 156 to apply a control signal to the holdover circuit 155. Thus, the holdover circuit receives a control signal as each character is read from tape. Normally, in the absence of an input signal the holdover circuits 155 applies a control signal to the timing and logic circuit 154. The control signal applied to the holdover circuit 155 by the gate 156 causes the holdover circuit 155 to remove the control signal to the timing and logic circuit 154. In response thereto the timing and logic circuit 154 is arranged for not applying a control signal to the stop output 154a. The holdover circuit 155 is arranged for maintaining the absence of a control signal at its output circuit longer than the time it takes the read head, in assembly 14, to read two successive characters in a record on tape but less than the time it takes the read head to traverse the inter-record gap. Therefore, after the last character of a record is sensed by the gate 156, the control signal at the output of the gate 156 is removed causing the holdover circuit 155 to subsequently form a control signal at its output circuit prior to the beginning of the next record. This causes the timing and logic circuit 154 to subsequently form a control signal at the stop line 154a and thereby cause the magnetic tape unit to stop reading tape. Thus, the elements 156, 155 and 154 serve to stop the magnetic tape transport at the end of each record.

Also included in FIG. 14 are some of the circuits already shown and described with reference to FIGS. 12 and 13. These are the BIF and AIF registers 126 and 127.

A gate 158 is provided and is responsive to the T1 output signal from 150 for clearing the content of the BIF, AIF registers to zero at the beginning of each reading operation of the magnetic tape.

A gate 164 is responsive to the output signals from the gate 156 for strobing each character provided by the reading circuitry 114 into the AIF register 127. The AIF register 127 and the BIF register 126 have the same number of flip-flops, namely seven. There is one flip-flop in the BIF register corresponding to each flip-flop in the AIF register. A gate 168 is responsive to timing signals from the timing unit 162 for complementing the state of each flip-flop in the BIF register 126 whose corresponding flip-flop in the AIF register 127 represents a "1" bit. In this manner, the BIF register 126, at any point in time during the reading of a record, indicates whether there has been an even or odd number of "1" bits read in each channel of the reading circuitry 114. The timing unit 162 is connected to the gate 156 and is arranged in a conventional manner for activating the gate 168 causing it to complement the appropriate flip-flops in the BIF register 126 after each character is stored in the AIF register 127.

The longitudinal parity check circuit 169 is arranged in a conventional manner well known in the computer art for monitoring the states of the flip-flops in both the AIF and BIF registers. The last character in each record is a parity check character which causes an odd number of "1" bits to be recorded in each channel in the corresponding record on tape if there is no parity error. The last character is stored in the AIF register 127 but is not used to complement the flip-flops of the BIF register 126. Therefore, it is necessary to monitor both the BIF register and the AIF register to determine whether the longitudinal parity is correct at the end of each record. To this end, the longitudinal parity check circuit 169 is arranged for monitoring the states of the flip-flops in both the BIF and AIF registers and for forming a control signal at the L.PAR.ER. output if the combination of bits in the BIF and AIF registers do not produce an odd number of "1's" for each channel read from the corresponding record. Also the longitudinal parity check circuit 169 is arranged for forming a control signal at the No. L.PAR.ER. output circuit if the combination of bits in the BIF and AIF registers do not produce an odd number of "1" bits for each channel of the corresponding record. Thus, a control signal is formed on the L.PAR.ER. output circuit if there is a longitudinal parity error, whereas, a control signal is formed at the No. L.PAR.ER. output circuit if there is no longitudinal parity error.

A transverse parity check circuit 170 is provided for setting a flip-flop 172 into a "1" state whenever there is a transverse parity error in any of the characters of a record. A parity error occurs if there is not an odd number of "1" bits in a character.

An OR gate 172 and an AND gate 174 combine the outputs of the longitudinal parity check circuit 169 and the transverse parity check circuit 170. The OR gate 172 applies a control signal to an AND gate 176 if there is either a longitudinal or transverse parity error indicated by a control signal at the L.PAR.ER. output or the flip-flop 172 is in a "1" state. The OR gate 174 applies a control signal to an AND gate 178 indicating no longitudinal parity error if there is a control signal at the No. L.PAR.ER. output circuit and the flip-flop 171 is in a "0" state. The AND gates 176 and 178 as well as the zero input of the flip-flop 171 are connected to the stop output circuit 154a. The control signal at the stop output circuit 154a causes the gates 176 and 178 to apply a control signal at their output circuits PAR.ER. and No. PAR.ER. (indicating parity error and no parity error, respectively) in response to a control signal from the corresponding gate 172 and 174.

Consider now FIG. 15. FIG. 15 shows a block diagram of the portion of the computer 100 for transferring characters of information, setting up tallies for use during the marginal test and for storing the increment at which failure occurs. The memory 102, the memory read and write control circuit 102a, the memory address register 108, the CIF register 120 and the MC1F and MC2F flip-flops are shown again in FIG. 15 for purposes of explanation.

Also included in FIG. 15 is a timing and control unit 180. The timing and control unit 180 is similar to the timing and control unit 132 of FIG. 13 and has inputs from outputs P03, P06, P11, P14, P15 and P21 of FIG. 16. The timing and control unit 180 is arranged for applying a control pulse at its output circuits, in sequence, in response to a control signal applied at any one of its input circuits. Similar in function and operation to 133 through 138 of FIG. 13, control and gating units 181 through 186 are provided in FIG. 15 for storing addresses into the memory address register 108. The control and gating units 181 through 186 each have an input connected to the output T1 from 180. In addition, the control and gating units 181 through 186 have an input from the output circuits P03, P06, P11, P14, P15 and P21, respectively, from FIG. 16. The control and gating units 181 through 186 are arranged for storing the addresses 007, 010, 012, 113, 014 and 105, respectively, into the memory address register 108 in response to a control signal at their two corresponding input circuits.

Similar to the memory address register 108, an address register SMN 188 is provided. Associated with the SMN address register 188 are control and gating units 191 through 196 for storing addresses into the SMN address register 188. The control and gating units 191 through 195 each have an input connected to the output T2 from 180 and, in addition, have input circuits connected to the output circuits P03, P06, P11, P14 and P15, respectively, from FIG. 16. The control and gating units 191 through 195 are responsive to a control signal at the two corresponding control circuits for storing the addresses 007, 103, 105, 016 and 107, respectively, into the SMN address register 188.

The control and gating unit 196 is arranged in a slightly different manner from the control and gating units 191 through 195 and has its control circuits connected to the P21 and T2 output circuits. However, in addition, the control and gating unit 196 is coupled to an address storage unit 198. The address storage unit 198 may be a conventional register or a counter which is initially set to a state representing the address 195 in response to a control signal from the output P02, and, in addition, is arranged for increasing the address from address 195 by one address each time a control signal is applied to the input thereof by the output P29 from FIG. 16. The control and gating unit 196 is arranged for storing the address contained in the address unit 198 into the SMN address register 188 in response to a control signal at the two corresponding control circuits thereof.

Similar to the memory read and write control circuit 102a, a read and write control circuit 102b is provided for causing information to be written into the storage location of the memory 102 designated by the address contained in the SMN address register 188. The writing operation in the memory 102 by the memory read and write control circuit 102b is initiated by a control signal from the MC2F flip-flop when it is into a "1" state.

Also, the MC1F flip-flop initiates a read cycle using the memory read and write control circuit 102a when it is set into a "1" state. The MC1F and MC2F flip-flops are set into a "1" state in response to a control pulse from the T3 and T4 output circuits, respectively, from 180. Also, the MC1F and MC2F flip-flops are set into a "0" state in response to a control pulse from the T4 and T5 output circuits, respectively, of 180.

A decoder 200 is coupled to the output of the CIF register 120. The decoder 200 is arranged for decoding the character stored in the CIF register 120 and for forming a control signal at its F.6 output circuits in response to a control pulse at T4 from 180 whenever a character representing a digit "6" is stored in the CIF register 120. The decoder 200 is also arranged for applying a control signal at its $\overline{F.6}$ output in response to a control pulse at the T4 output circuit from 180 whenever any other character other than a "6" is contained in the CIF register 120.

Consider now the block diagram of the portion of the computer shown in FIG. 16. The operation of the computer 100 may be initiated in a number of ways, for example by closing the switch 202 causing ground potential to be applied to the timing and control unit 204 or by internal gating and control (not shown) in the timing and control unit 204. The timing and control unit 204 may be arranged in any one of a number of well known manners in the computer art for applying control signals at the output circuits P01 and P02, in sequence. A control signal at the P02 output circuit causes an OR gate 206 to apply a control signal to a timing and control unit 208. The timing and control unit 208 applies a control signal at its output P03 in response to a control signal thereto.

A timing and control unit 210 is arranged in response to the coincidence of a control signal at the P03 output circuit and the control pulse at $\overline{F.6}$ (from FIG. 15) for commencing a sequence of operation wherein control signals are applied at output circuits P04, P05, P06 and P07. The timing and control unit 210 is also arranged for applying a control signal at an output P07 in response to a control signal at P29 described hereinafter.

A timing and control unit 212 is responsive to a control signal from an AND gate 214 for forming control signals at the following output circuits in sequence, P08, P10, P11 and P12. The AND gate 124 has its input connected to the output P29 and the output of an AND gate 126. The AND gate 126 has its inputs connected to the output circuits P07 and the ╪ output from FIG. 13.

The timing and control unit 212 is also set into a condition wherein a control signal is formed at the P12 output in response to a control signal from an OR gate 218. The OR gate 218 has its inputs connected to the output of an AND gate 220 and to the output circuit P22 described hereinafter.

A timing and control unit 222 is responsive to the combination of control signals from the outputs P12 and ╪ (from FIG. 13) for forming control signals at the following outputs in sequence, P13, P14, P15 and P16. The timing and control unit 222 is also responsive to a control signal from the OR gate 224 for forming a control signal at the output circuit P16. The OR gate 224 has its inputs connected to the output circuit P19 and the output circuit of an OR gate 226. The OR gate 226 has its inputs connected to the AND gates 228 and 230. The AND gate 228 has its input circuit connected to the output No.ER.CTING from a storage device 230 (described in more detail hereinbelow) and the output circuit P18. The AND gate 230 has its inputs connected to the output No.PAR.ER from FIG. 14 and the output circuit P18.

With this gating arrangement the timing and control unit 222 is set so that a control signal is formed at the P16 output circuit in response to either the combination of control signals from P18 and No. ER.CTING or control signals from P18 and No. PAR.ER.

The storage device 230 may be a conventional storage device for forming a control signal at one of its two output circuits depending on the control signal applied thereto. A control signal at the P10 output circuit causes the storage device 230 to store a signal which causes a control signal at the No. ER.CTING output circuit, whereas, a control signal at the P22 output circuit causes the storage device 230 to store a signal causing a control signal to be applied at the ER.CTING output circuit.

A timing and control unit 232 is provided for forming control signals at the following output circuits, in sequence, P17 and P18. The timing and control unit 232 forms its control signals in response to the combination of a control signal from P16 and from the ≠ output cirtcuitcuit from FIG. 13. A timing and control unit 234 is provided for forming a control signal at the output P19 in response to a control signal from an AND gate 236. The AND gate 236 has inputs connected to the output circuits P18, PAR.ER (from FIG. 14) and ER.CTING. Thus, the timing and control unit 234 forms a control signal at the P19 output circuit in response to the combination of control signals from the output circuits P18, PAR.ER, and ER.CTING.

A timing and control unit 238 is responsive to the combination of control signals at the P16 and = (from FIG. 13) output circuits for forming a control signal at the P20 output circuit thereof. A timing and control unit 240 is responsive to the combination of control signals from the P20 output circuit and the $B>A$ output circuit from FIG. 13 for applying control signals at the following output circuits, in sequence, P21 and P22. A timing and control unit 242 is responsive to the combination of control signals at the output circuits P03 and $\overline{F.\ 6}$ (see FIG. 15) for applying control signals at the following output circuits, in sequence, P23 through P28. A timing and control unit 246 is responsive to the combination of control signals from the output circuits P07 and = (from FIG. 13) for forming a control signal at the P09 output circuit thereof. A timing and control unit 248 is responsive to the combination of control signals from the output circuits P12 and = (from FIG. 13) for forming a control signal at the P29 output circuit thereof.

OPERATION

Consider now the operation of the marginal test apparatus (including the computer 100, the tape 16 and the card reader 18) and of the magnetic tape transport during the marginal test using T.F.#1—read acceptance level. The following discussion of operation of the marginal test test apparatus can best be understood with reference to the flow chart of FIG. 17. With reference to FIG. 17 it will be noted that the flow steps are arranged in boxes and at the upper right-hand corner of each box in the flow appears a symbol corresponding to one of the output circuits in the computer control of FIG. 16. The operation of the marginal test apparatus can be readily understood by correlating these symbols with the corresponding symbols in FIG. 16.

It should also be kept in mind during the following discussion that it is necessary to keep track of the number of channel blocks which have been read in each test file, the number of increments read within each channel block and the number of records read within each increment. This is one of the functions of the marginal test apparatus as will become evident in the following discussion.

Initially the marginal test apparatus is started in operation by closing a switch such as 202 (FIG. 16) activating the timing and control unit 204. Control signals are subsequently formed at the P01 and P02 output circuits causing certain preliminary operations such as positioning the magnetic test tape 16 so that it is ready to read the EOF character at the beginning of T.F.#1 (see FIG. 2). The details for carrying out this operation are not described and the apparatus, therefore, is not shown in detail as it is done in a conventional manner well known in the computer art. As far as the invention is concerned, it may be assumed that initially, or at least following the control signal at P02, the marginal test tape is positioned with the read head ready to commence reading the EOF character at the beginning of T.F.#1.

During the control signal at P03 a test is made to determine if the file is the last file on tape. This operation is redundant at this point in the operation but becomes important at the end of each of the test files and the description thereof will be given hereinafter.

The control signal at the P02 output circuit causes the timing and control unit 208 to form the control signal at the P03 output circuit and a signal is simultaneously formed at the $\overline{F.\ 6}$ which causes the timing and control unit 210 to start forming control signals at its output circuits.

The control signal at the P04 output circuit is applied to the card reader 18 (see FIG. 1). This causes the card reader 18 to start reading two cards of information and presenting the information character by character to the write control circuitry 104. The write control circuitry 104 is arranged in a conventional manner in the computer art for storing the information in the memory 102.

Different types of information are stored in the memory 102 from the card reader 18. However, for purposes of this discussion, the only pertinent information stored is that indicated in the following memory locations as indicated in Table VII: memory locations 007, 010, 012, 014, 016, 018, 113, 114. Table VII shows the constants loaded into the above-mentioned memory locations for use in each of the marginal tests.

For T.F.#1 the following constants are loaded into memory; a character 1, the number of the test file, is loaded into memory location 007; a character 7, the number of channel blocks in T.F.#1, is loaded into memory location 010; a character representing 18, representing the number of increments within each channel block is loaded into memory location 012; a character 5, representing the number of records within each increment in T.F.#1, is loaded into memory location 014; a character "0," representing no errors is loaded into memory location 016; a character 2 representing the maximum number of permissible errors for any one increment in T.F.#1 is loaded into memory location 018; a character "0" is loaded into memory location 113 and a character "1" is loaded into memory location 114.

After the above-mentioned information from cards is loaded into the memory 102, a control signal is formed at the P05 output circuit. During the control signal at P05 the EOF character positioned at the beginning of T.F.#1 is read by the magnetic tape unit 10. To this end the control signal at the P05 output circuit causes the gate 152 (FIG. 14) to apply a control signal to the start line 152a. This causes the magnetic tape unit 10 to start reading information from the test tape 16. After the character EOF is read, there is a space before the beginning of the first record in T.F.#1. The gate 156, the holdover circuit 155 and the timing and logic 154 sense the absence of signals following the EOF character and apply a control signal to the stop line 154a, causing the magnetic tape unit 10 to stop reading immediately after the EOF character is read.

Refer now to FIG. 12. During the control signal at P06 the channel tally is set. Stating it in another way, the character representing the number of channel blocks in T.F.#1 is transferred to a pre-arranged location in memory from which the character is counted as each channel block is read from tape. To this end, the control signal at the P06 output circuit activates the timing and control unit 180 in FIG. 15 and applies a continuous control signal to the control and gating units 182 and 192. The control pulse at T1 of 180 causes the control and gating unit 182 to store the memory address 010 into the memory address register 108. With reference to Table VII it will be noted that memory location 010 contains the character representing the number of channel blocks in T.F.#1. The control pulse at T2 from 180 causes the control and gating unit 192 to store the address 103 into the SMN address register 188. With reference to Table VII it will be noted that memory location 103 is for storing the channel tally. The control pulse at T3 from 180 causes the MC1F flip-flop to be bet into a "1" state causing the memory read and write control circuit 102*a* to read out the content of memory location 010 (character 7) and causes the character to be stored into the CIF register 120. The control pulse at T4 resets MC1F flip-flop to a "0" state and sets the MC2F flip-flop to a "1" state. This causes the memory read and write control circuit 102*b* to write the character 7 into memory location 103 as addressed by the SMN register 188. The control pulse at T5 resets the MC2F flip-flop to a "0" state.

Thus, at this point a channel tally representing the number of channel blocks in T.F.#1 is contained in memory location 103. It will also be noted that the apparatus of FIG. 15, including the memory location 103, comprise means for storing the channel tally.

Subsequently, the control signal at P07 causes the marginal test apparatus to determine whether the channel tally is zero. To this end the operation of the marginal test apparatus shown in FIG. 13 causes the channel tally contained in memory location 103 to be read out, tested for zero and restored in the memory.

Referring to FIG. 13, the timing and control unit 132 is responsive to the control signal at P08 for forming control pulses at its output circuits. The control pulse at T1 from 132 causes the control and gating unit 133 to store the address 113 into the memory address register 108. The control pulse at T2 sets the MC1F flip-flop into a "1" state causing the memory read and write control circuit 102*a* to read out the content of memory location 113 and store it in the CIF register 120. With reference to Table VII the content of memory location 113 is a character "0."

During the control pulse at T3 of 132 the gate 147 stores the "0" character from the CIF register 120 into the BIF register 127. Additionally, the control pulse at T3 resets the MC1F flip-flop to a "0" state. The control pulse at the T4 output of 132 causes the control and gating unit 134 to store the address 103 into the memory address register 108. The control pulse at T5 sets the MC1F flip-flop into a "1" state causing the content of the memory location 103 to be read out and stored in the CIF register 120. With reference to Table VII it will be noted that the memory location 103 contains the channel tally, now a character 7. The control pulse at T6 resets the MC1F flip-flop to a "0" state and causes the gate 146 to store the character 7 (from CIF) into the AIF register 126. The control pulse at T7 from 132 causes the compare logic 148 to form an output signal at one of its three output circuits indicative of the relationship between the characters stored in the registers 126 and 127. Since the channel tally (in the BIF register) is not equal to the character "0" (in the BIF register 127), the compare logic 148 forms a control signal at its ‡ output circuit. Therefore, it can now be seen that the apparatus of FIG. 13 tests the channel tally (contained in memory location 103) to see if it is zero.

Referring back to FIG. 16, the control signal at the ‡ output circuit from FIG. 13, in combination with the signal at P07, causes the timing and control unit 212 to start forming a control signal at the output P08.

During the control pulse at P08 the magnitude of the channel tally is decreased by 1 to indicate that one channel block of T.F.#1 is being read. To this end the subtracting apparatus shown in FIG. 12 causes the channel tally contained in 103 to be decreased by 1 and restored in memory location 103. The timing and control unit 106 causes control pulses to be formed at its output circuits in sequence. The control pulse at T1 from 106 causes the control and gating unit 110 to store the address 114 into the memory address register 108. The control pulse at T2 from 106 causes the MC1F flip-flop to be set into a "1" state. The "1" state of the MC1F flip-flop causes the memory read and write control circuit 102*a* to read out the content of memory location 114 and store it into the CIF register 120.

With reference to Table VII, it will be noted that a character "1" has been stored into the memory location 114 from the card reader 18, therefore, at this point in the operation a character "1" is contained in the CIF register 120.

The control pulse at the T3 output of 106 causes the gate 129 to store the character 1 into the BIF register 127, causes the MC1F flip-flop to be reset to a "0" state and causes the control and gating unit 111 to store the address 103 into the memory address register 108.

The control pulse at the T4 output causes the MC1F flip-flop to be set into a "1" state causing the content of memory location 103 to be read out and stored in the CIF register 120. As noted hereinabove, memory location 103 contains the channel tally, a character "7," therefore a character "7" is contained in the CIF register 120. The control pulse at T5 resets the MC1F flip-flop to a "0" state again and causes the address 103 to again be stored into the memory address register 108. The control pulse at the T5 output of 106 also causes the gate 128 to store the character "7" from the CIF register 120 into the AIF register 126.

The control pulse at the T6 output causes the output signals from the adder 130 to be stored into the CIF register 120. The adder 130 is arranged for subtracting the character "1" contained in the BIF register 127 from the character "7" contained in the AIF register 126, therefore, a character "6" is formed at the output of the adder circuit 130 and is stored in the CIF register 120.

The control pulse at the T7 output from 106 causes the MC2F flip-flop to be set into a "1" state causing the character "6" contained in the CIF register 120 to be written into memory location 103. Memory location 103 is the same memory location from which the channel tally was originally read. The control pulse at the T8 output of 106 causes the MC2F flip-flop to be set to a "0" state. Therefore, it will now be understood that the apparatus of FIG. 12 comprises means for decreasing or modifying the magnitude of the channel tally.

During the control signal at P10 (FIG. 16) an error counting signal is stored in the storage device 230. Thus, following the control signal at P10 a control signal is formed at the ER.CTING output circuit. To be described in the following discussion this signal is important during the control signal at P18.

During the control signal at P11 the increment tally contained in memory location 012 is transferred to the memory location 105. This transfer is performed by the transfer apparatus disclosed in FIG. 15 similar to that described for the channel tally with reference to the control signal at P06. The difference being that the control signal at P11 causes the control and gating unit 183 to store the address 012 into the memory address register 108 and causes the control and gating unit 193 to store the address 105 into the SMN register 188. Thus, following the control signal at P11 the increment tally designating the number of increments per channel block in T.F.#1 is stored in memory location 105.

During the control signal at P12 the increment tally is tested for zero. The test for zero is performed by the compare apparatus shown in FIG. 13, in a similar manner to that described with reference to the signal at P07, the difference in operation being that the control and gating 133 and 135 is used rather than the control and gating 133 and 134. The increment tally is initially 18. Thus, during the control signal at P12 the compare logic 148 detects that the increment tally is not equal to zero and forms a control pulse at the ≠ output circuit causing a control signal to be formed at the P13 output of the computer control unit 222 shown in FIG. 16.

During the control signal at the P13 output of FIG. 16 the increment tally (18) contained in memory location 105 is decreased by 1 to indicate that one increment of the channel block is being read. This operation is performed by the subtraction apparatus shown in FIG. 12 in a similar manner to that described for the channel tally with reference to the control signal at P08. The difference in operation being that the control and gating units 110 and 112 are used to store the addresses 114 and 105 in the memory address register 108 as opposed to the control and gating units 110 and 111. Thus, at the end of the control signal at P13 the increment tally has been restored in memory location 105 with the magnitude thereof being decreased by 1. Thus, at this point, the increment tally is reduced to "17" and is stored in memory location 105.

During the control signal at P14 the error tally is set to "0." Stating it another way, a "0" is transferred from memory location 113 to the memory location 016 which is used for the error tally. To this end the transfer apparatus shown in FIG. 15 transfers the character "0" from memory location 113 to the memory location 016 (see Table VII) in a similar manner to that described for the set channel tally operation during P06. However, instead of using the control and gating units 182 and 192 as during P06, the control and gating units 184 and 194 are used for the transfer operation. Thus, at the end of signal at P11 a character "0" is contained in tally memory location 016.

During the control signal at P15 the record tally is set. The setting of the record tally is accomplished by transferring the record tally contained in memory location 014 to memory location 107 (see Table VII). This operation is performed using the transfer apparatus of FIG. 15 similar to that described with reference to the set channel tally operation described with reference to the signal at P06. However, during the set record tally operation the control signal at P15 causes the control and gating units 185 and 195 to be used to cause the transfer to take place. Thus, at the end of the control signal at P15 the memory location 107 contains the record tally character "5."

During the control signal at P16 the record tally is tested for zero. This is accomplished by the compare apparatus shown in FIG. 13 in a similar manner to that described with reference to the test channel tally for zero performed during the control signal at P07. However, due to the control signal at P16, the test record tally for zero operation is performed using the control and gating units 133 and 136 rather than 133 and 134 as used during the signal at P07.

The record tally has not been decreased as yet, and, therefore, is still "5." Therefore, the compare logic 148 of FIG. 14 forms a control signal at the ≠ output signals indicating that the record tally is not "0." The control pulse at the ≠ output, in combination with the control signal at P16, causes the timing and control unit 232 of FIG. 16 to form control signals at the output circuits P17 and P18.

The control signal at the P16 output circuit activates the subtract apparatus shown in FIG. 12. This causes the record tally to be decreased by 1 in a similar manner to that described with reference to FIG. 12 for the channel tally during the control signal at P08. However, during the control signal at P17 the control and gating units 110 and 113 are used rather than 110 and 111. Therefore, at the end of the control signal at P17 the record tally "5" contained in memory location 107 is decreased to "4" and the character "4" is restored into the record tally memory location 107.

The control signal at P18 causes the magnetic tape unit 10 to read a record from the test tape 16. To this end the the control signal at P18 activates the tape read circuitry of FIG. 14. Referring to FIG. 14, the control signal at P18 causes the gate 152 to apply a start signal to the magnetic tape unit 10 causing it to start reading the first record of T.F.#1 from the magnetic test tape 16. As each character is read from the test tape it is stored into the AIF register 127 and subsequently used to complement the bits of the BIF register 126 as described hereinabove. Each time a "1" bit is stored in a flip-flop of the AIF register 127 the corresponding flip-flop in the BIF register 126 is complemented by the gate 168. If a transverse parity error is detected in any character read from tape, the transverse parity check circuit 170 triggers the flip-flop 171 into a "1" state causing the gate 172 to apply a control signal to the gate 176.

Assume that the last character of the first record is read from tape. The inter-record gap between records causes the gate 156, the holdover circuit 165, and the timing and logic to apply a stop signal to the line 154a and thereby causes the magnetic tape unit 10 to stop reading. The last character of the record is stored in the AIF register 127 but is not used to complement the BIF register 126. The longitudinal parity check circuit 169 combines the signals from the BIF register 126 and the AIF register 127 and if the number of bits received in each bit position is not odd, the longitudinal parity check circuit 169 detects that there is a longitudinal parity error and forms a control signal at the L.PAR.ER output line to the gate 172. Therefore, at the end of any record if either a transverse parity error occurs in any of the characters or a longitudinal parity error is detected, the gate 172 will apply a signal to the gate 176 indicating a parity error. The control signal from the timing and logic unit 154 gates out the signal from the gates 176 and 178 to the PAR.ER line and the No.PAR.ER line. Thus, after a parity error has occurred, a control pulse will appear on the PAR.ER line, whereas, if a no parity error appears no control pulse will appear at the No.PAR.ER line.

Referring back to FIG. 16, if a parity error occurs, the signal on the PAR.ER line, in combination with the control signals at the P18 and ER.CTING output circuits, causes the gate 236 to cause the timing and control unit 234 to form a control signal at the P19 output circuit.

During the control signal at the P19 output circuit the compare tally is increased to "1" to note a parity error has occurred in one record. To this end, the control signal at the P19 output circuit activates the add and subtract apparatus of FIG. 12. Referring to FIG. 13 the gates 110 and 114 cause the content of memory locations 114 and 016 (see Table VII) to be transferred to the BIF and AIF registers 127 and 126 respectively, similar to that described with reference to the control signal at P08. However, since a control signal is being formed at the P19 output circuit, it causes the adder circuit 130 to add (rather than subtract) the number contained in BIF to the error tally, contained in 126 and forms signals corresponding to the sum. Since the error tally is initially a character "0," a character corresponding to the character "1" is formed at the adder 130 and the control pulse at the T6, T7 and T8 output circuits of 106 subsequently cause a character "1" to be written back into the error tally memory location 016.

Referring back to FIG. 16, the control signal at the P19 output circuit causes the gate 224 to cause the timing and control unit 222 to again form a control signal at the P16 output circuit. If no error is detected during the first record of increment #1, then a control signal is not formed at the P19 output circuit following the control signal at P18. With reference to FIG. 16 it will be noted that a control signal at the No.PAR.ER output circuit in combination with the control signal at the P18 output circuit causes the gates 230, 226 and 224 to cause the timing and control unit 222 to form a control signal at the P16 output circuit, thereby skipping the P19 output circuit.

Control signals are formed at the P16, P17, P18 output circuits over again for each record read from tape. Each time a control signal is formed at the P18 output circuit a new record is read from the magnetic test tape. If an error is detected in parity in any of the records, then a control signal is formed at the P19 output circuit following the P18 control signal and the error tally is increased by 1, as described hereinabove. This operation is continued until the record tally is decreased to "0" by the subtract apparatus of FIG. 12.

Assume that the record tally contained in memory location 107 is reduced to zero and a control signal is formed at P16. Under these conditions the compare logic 148 of FIG. 13 forms a control signal at the = output. The control signal at the P16 output circuit in combination with the control signal at the = output circuit from FIG. 13 causes the timing and control unit 238 (FIG. 16) to form a control signal at the P20 output circuit.

During a control signal at the P20 output circuit the error tally contained in memory location 016 is compared with the error limit character contained in memory location 018 (see Table VII). Assume that the error tally contained in memory location 016 is greater than the error limit contained in memory location 018 and consider the operation of the transfer apparatus shown in FIG. 13. The control signal at the P20 output circuit activates the timing and control unit 132 and causes the control and gating units 137 and 138 to store the address 113 in the memory address register 108. Therefore, the content of the memory locations 016 and 018 are read out and stored in the BIF register 127 and the AIF register 126 respectively. The details of operation of the apparatus of FIG. 13 will not be described in detail as it is essentially the same as that described with reference to the control signal at P07 except to note that the control and gating circuits 137 and 138 are used rather than the control and gating circuits 133 and 134.

At this point, the error tally character is contained in the BIF register 127 and the error limit character is contained in the AIF register 126. Since it has been assumed that the error tally is greater than the error limit, the compare logic 148 forms a control pulse at $B>A$ output circuit in response to the control pulse at T7 from 132. The control pulse at the $B>A$ output circuit indicates that the number of parity errors which occurred during the reading of increment #1 exceeded the permissible limit and there is a failure in the reading apparatus 12 and 14 (see FIG. 1).

The control signal at the $B>A$ output circuit, in combination with the control signal at the P20 output circuit, causes the timing and control unit 240 (FIG. 16) to form control signals, sequentially, at the output circuits P21 and P22.

During the control signal at P21 the magnitude of the incrementally contained in memory location 105 is read out from the memory location 105 and stored in memory location 195. The memory location 195 and the memory locations subsequent thereto are reserved for storing the result of the test on each file. This is done by storing the value of the increment tally when the number of errors detected in an increment exceeds the limit specified by the error limit contained in memory location O18.

To this end the control signal at the P21 output circuit causes the transfer apparatus of FIG. 15 to be activated and transfer the increment tally from memory location 105 to 195. Referring to FIG. 15 during the control signal at the P21 output circuit the address 105 is stored in the address memory 108 by the control and gating unit 186 and the address 195 contained in the address storage unit 198 is stored in the SMN register 188 by the control and gating unit 196. Thus, the increment tally contained in memory location 105 is read out, stored in the CIF register 120, and subsequently is written back into memory location 195 similar to the operation described with reference to the control signal at P06. Thus at this point, the increment tally 17 is contained in the memory location 195 indicating that the next larger increment, namely, increment 18, caused a failure in the reading and writing apparatus 12 and 14.

Refer to FIG. 16 and assume that the error tally is not larger than the error limit when the control signal is formed at P20. Under these conditions a control signal is formed at the $\overline{B>A}$ during the signal at P20. The control pulse at $\overline{B>A}$ in combination with the control signal from P20 causes gates 220 and 218 to cause the timing and control unit 212 to return to the condition wherein a control signal is formed at the P12 output circuit. Thus, a control signal at the P21 output circuit is not formed and the increment tally is not stored in memory location 195.

Continuing with the control signal at P22, which automatically follows P21, the apparatus of FIG. 16 is responsive to the control signal at P22 to cause the error counting signal to be cleared out of the storage device 230. With the error counting signal cleared out of the storage device 230, control signals are not formed at P19 in subsequent operations until the next channel block is reached, at which time another control signal is formed at the P10 output circuit. This arrangement is provided because any errors in the increments subsequent to the one which failed are immaterial and need not be counted since the information in the subsequent increments is degraded to a lower value to the one which failed and would naturally fail also.

Referring to FIG. 16, the control signal at the P22 output circuit also causes the gate 218 to reset the timing and control unit 212 so that it forms a control signal at the P12 output circuit again. The control signals at the output circuits P12 through P18 are repeated over for each increment until the increment tally has been reduced to zero indicating that the last increment in the channel CH.1 has been read. When the last increment of channel CH.1 is read a control signal is formed at the = output circuit (FIG. 13) causing the timing and control unit 248 of FIG. 16 to form a control signal at the P29 output circuit. The control signal at the P29 output circuit causes the address contained in the address storage unit 198 (FIG. 15) to be counted up so that it now contains the address 196. The control signal at P29 also causes the timing and control unit 210 to start forming another control signal at the P07 output circuit.

The control signal at the P07 output circuit again causes the channel tally to be reduced by 1 so that it is indicating channel CH.2. Control signals are subsequently formed at the P07 through P20 output circuits, similar to that described hereinabove, the operation continuing until the channel tally is reduced to zero. When the channel tally has been reduced to "0," it will be detected during a control signal at the P07 output circuit. When the channel tally has been reduced to zero it will be detected by a control pulse at the = output circuit from the compare logic 148 of FIG. 13 and a control signal will be present at the P07 output circuit. Referring to FIG. 16, a control signal at the = output circuit from FIG. 13 in coincidence with the output signal at the P07 output circuit causes the timing and control unit 246 to form a control signal at the P09 output. The control signal at P09 causes the gate 152 of FIG. 14 to start the operation of the tape transport 10 causing it to read the EOF character following immediately at the end of T.F.#1.

The control signal at P09 also causes the gate 206 to cause the timing and control unit 208 to form another control signal at the P03 output circuit. The following control signals at the P03, P04 and P05 output circuits cause an operation similar to that described above. However, this time two cards are read from the card reader. The cards contain the following information for T.F.#2 (see Table VII) and is stored as follows: the channel tally character "14" is stored in memory location 010; the increment tally character "20" is stored in memory location 012; the record tally character "10" is stored in memory location 014; the error limit character "5" is stored in memory location 18; character "0" is again stored in memory location 113; and a character "1" is again stored in memory location 114. The sequence of operations described hereinabove are then repeated using these new constants for T.F.#2. The foregoing operation is repeated for each of the test files 3 through 6, the results being accumulated in the memory field following memory location 195.

Refer to FIG. 15 and assume now that T.F.#6 has been read, the result is stored in one of the memory locations following 195 and a control signal is formed at P03. The control signal at P03 activates the transfer apparatus shown in FIG. 15. To this end, the control signal at the P03 output circuit causes the control and gating unit 181 to store the address 007 into the memory address register 108 and the control and gating unit 191 stores the address 007 into the SMN address register 188. Subsequently, the content of the memory location 007 is read out and stored in CIF register 120. Referring to Table VII, it will be noted that the memory location 007 contains the file number which is a character "6" for T.F.#6. Thus, the decoder 200 detects that this is T.F.#6 and forms a control signal at the F.6 output circuit. A control signal at the F.6 output circuit in combination with the control signal at the P03 output circuit causes the timing and control unit 242 of FIG. 16 to commence forming control signals at the P23 through P28 output circuits.

During the control signals at the P23 through P28 outputs certain editing operations are performed which organize the data in the result field in memory locations 195 and subsequent memory locations in proper form for printing data in a printing unit or the like for use by an operator. In other words, the result or increment stored in memory location 195 and subsequent memory locations are edited and rearranged in a form which can be sent out to a printer for operator use. These editing operations are conventional computing operations and are not described herein as the details thereof are not important for a complete understanding of the present invention.

Although one embodiment of the present invention is shown by way of example, other re-arrangements of the apparatus described herein may be devised within the scope of the invention defined in the following claims. For example, different types of means may be used for forming the sequence control within the scope of the present invention. Also by way of example, instead of counting the increments read from tape in the computer characters representing the level of degradation of the preceding or following increments may be stored right on tape and read therefrom and subsequently stored in the desired location when an error is detected. Additionally, a system may be devised whereby errors in the data read is checked at least partially after it is stored in memory. For example, by storing a special character representing an error in memory each time a parity error is detected and checking for this error.

We claim:

1. Data processing means for determining the point of failure of reading means for a record member having readable indicia stored thereon, wherein the indicia are arranged in increments to be read in a predetermined sequence, at least some of the increments containing indicia which are degraded in readability a predetermined amount from the indicia in another increment, the combination comprising: means for reading indicia from such record member in a predetermined sequence and for providing signals corresponding to those read, means for providing a unique signal corresponding to the amount of degradation of the indicia within the increment being read from such record member, means for monitoring the signals provided by the reading means and for detecting an error in the signals, means for storing the value of said unique signal, and means for causing the last named means to store the unique signal when at least one error in reading is detected thereby causing a signal representing the increment of failure to be stored.

2. Data processing means for determining the point of failure of reading means for a record member having readable indicia stored thereon, wherein the indicia are arranged in increments, each increment having a plurality of said indicia, said indicia being arranged to be read in a predetermined sequence and being sequentially degraded in readability a predetermined amount from increment to increment in said sequence, the combination, comprising: means for reading indicia from such record member in a predetermined sequence and for providing signals corresponding to those read, means for providing an increment signal corresponding to each increment read from such record member, means for monitoring the signals provided by the reading means and for detecting an error in the signals, means for storing a digital signal representing no errors at the beginning of each increment read from such record member and for modifying the stored error signal at at least some of the detected errors so as to represent the number of detected errors, means for comparing the error signal with a signal representing a preselected maximum number of errors and for forming an indication when the error signal exceeds the maximum number, and means for storing the value of said unique increment signal including means for causing such storage when said indication occurs thereby causing a signal representing the increment of failure to be stored.

3. Data processing means for determining the point of failure of a record member reading means, comprising: a record member having readable indicia stored thereon, wherein the indicia are arranged in increments, each increment having a plurality of such indicia, said indicia being arranged to be read in a predetermined sequence and being sequentially degraded in readability a predetermined amount from increment to increment in said sequence of increments, means for reading the increments from the record member in said sequence and for providing signals corresponding to those read, means for providing a unique increment signal indicative of each increment read from the record member, means for monitoring the signals provided by the reading means and for detecting an error in the signals, means for storing an error signal representing no errors at the beginning of each increment read from the record member and for modifying the stored error signal at at least some of the detected errors so as to represent the number of detected errors, means for comparing the error signal with a signal representing a preselected maximum number of errors and for forming an indication when the error signal exceeds the maximum number, and means for storing the value of said unique increment signal including means for causing such storage when said indication occurs thereby causing a signal representing the increment of failure to be stored.

4. Data processing means for determining the point of failure of a record member reading means, comprising: a record member having readable indicia stored thereon and arranged in a series of increments, each increment having a series of records each record having a series of such indicia, said indicia being arranged to be read in a predetermined sequence and sequentially degraded in readability a predetermined amount from increment to increment in said sequence of increments and the indicia within the records of each increment being of the same degraded value, means for reading the indicia from the record member in said sequence and for providing signals corresponding to those read, means for providing a unique increment signal indicative of each increment of indicia read from the record member, means for monitoring the signals provided by the reading means and for detecting an error in the signals, means for storing an error signal representing no errors at the beginning of each increment read from the record member and for modifying the stored error signal at at least some of the detected errors so as to represent the number of detected errors, means for comparing the error signal with a signal representing a preselected maximum number of errors and for forming an indication when the error signal exceeds the maximum number, and means for storing the value of said unique increment signal including means for causing such storage when said indication occurs thereby causing a signal representing the increment of failure to be stored.

5. Data processing means for determining the point of failure of a record member reading means, comprising: a record member having readable indicia stored thereon and arranged in a series of increments, each increment having a series of records having a series of such indicia, said indicia being arranged to be read in a predetermined sequence and sequentially degraded in readability a predetermined amount from increment to increment in said sequence of increments and the indicia within the records of each increment being of the same degraded value, means for reading the indicia from the record member in said sequence and for providing signals corresponding to those read, means for providing a unique increment signal corresponding to the amount of degradation of the increment being read from the record member, means for monitoring the signals provided by the reading means and for detecting an error in the signals, means for storing the value of the unique increment signal and means for causing the last named means to store the increment signal when at least one error in reading is detected thereby causing a signal representing the increment of failure to be stored.

6. Data processing means for determining the point of failure of a magnetic tape reading means, comprising: a magnetic test tape having a series of increments, each increment having a series of records and each record having a series of digital indicia, said indicia being distributed along the length of the tape and sequentially degraded a predetermined amount from increment to increment in said series of increments and the indicia within the records of each increment being of the same degraded value, means for serially reading the indicia from tape and for providing signals corresponding to those read from tape, means for storing an increment signal representative of the number of said increments, means for decreasing the value of the stored increment signal by one as each increment is read from tape, means for monitoring the signals provided by the reading means and for detecting an error in the signals, means for storing a digital error signal representing no errors at the beginning of each increment read from tape and for modifying the stored error signal at at least some of the detected errors so as to represent the number of detected errors, means for comparing the error signal with a signal representing a preselected maximum number of errors and for forming an indication when the error signal exceeds the maximum number, and means for storing a signal representing the value of the stored digital signal including means for causing such storage when said indication occurs thereby causing a signal representing the increment of failure to be stored.

7. Data processing means for determining the point of failure of a magnetic tape reading means, comprising: a magnetic test tape having a series of increments and each increment having a series of records having a series of digital indicia, said indicia being distributed along the length of the tape and sequentially degraded a predetermined amount from increment to increment in said series of increments and the indicia within the records of each increment being of the same degraded value and being coded with a predetermined parity format, means for serially reading the indicia from tape and for providing signals corresponding to the increment of indicia read from tape, means for storing an increment signal representative of the number of said increments read, means for decreasing the value of the stored increment signal by one increment as each increment is read from tape, parity check circuit means for monitoring the signals provided by the reading means and for detecting an error in parity in such signals, means for storing an error signal representing no parity errors at the beginning of each increment read from tape and for modifying the stored error signal at at least some of the detected errors so as to represent the number of detected errors, means for comparing the parity error signal with a signal representing a preselected maximum number of parity errors when the modified and stored record signal is zero and for forming an output signal when the error signal exceeds the maximum parity error, and means for storing a signal representing the value of the stored increment signal including means for causing such storage when said output signal occurs thereby causing a signal representing the increment of failure to be stored.

8. Data processing means for determining the point of failure of a magnetic tape reading means, comprising: a magnetic test tape having a series of increments and each increment having a series of records having a series of digital indicia, said indicia being distributed along the length of the tape and sequentially degraded a predetermined amount from increment to increment in said series of increments and the indicia within the records of each increment being of the same degraded value and being coded with a predetermined parity format, for both longitudinal and transverse parity error, means for serially reading the indicia from tape and for providing signals corresponding to those read from tape, means for storing an increment signal representative of the number of said increments, means for decreasing the value of the stored increment signal by one increment as each increment is read from tape, parity check circuit means for monitoring the signals provided by the reading means and for detecting an error in either longitudinal or transverse parity in such signals, means for storing an error signal representing no parity errors at the beginning of each increment read from tape and for modifying the stored error signal once for each record detected as being read with a parity error so as to represent the number of detected errors, means for comparing the parity error signal with a signal representing a preselected maximum number of parity errors and for forming an output signal when the error signal exceeds the maximum parity error, and means for storing a signal representing the value of the stored increment signal including means for causing such storage when said output signal occurs thereby causing a signal representing the increment of failure to be stored.

9. Data processing means for determining the point of failure of a record member reading means comprising: an elongated record member having readable indicia stored thereon arranged in a series of increments, each increment having a series of records having a series of such indicia, said indicia being distributed along the length of the record member and sequentially degraded in readibility a predetermined amount from increment to increment in said series of increments and the indicia within the records of each increment being of the same degraded value, means for serially reading the indicia from the record member and for providing signals corresponding to those read, means for storing an increment signal representative of the number of said increments, means for decreasing the value of the stored increment signal by one increment as each increment is read from tape, means for monitoring the signals provided by the reading means and for detecting an error in the signals, means for storing an error signal representing no errors at the beginning of each increment read from the record member and for modifying the stored error signal at at least some of the detected errors so as to represent the number of detected errors, means for comparing the error signal with a signal representing a preselected maximum error and for forming an indication when the error signal exceeds the maximum error, and means for storing a signal representing the value of the stored increment signal including means for causing such storage when said indication occurs thereby causing a signal representing the increment of failure to be stored.

10. Data processing means for determining the point of failure of a magnetic tape reading means, comprising: a magnetic test tape having a series of increments and each increment having a series of records having a series of digital indicia, said indicia being distributed along the length of the tape and sequentially degraded a predetermined amount from increment to increment in said series of increments and the indicia within the records of each increment being of the same degraded value, means for serially reading the indicia from tape and for providing signals corresponding to those read from tape, means for storing an increment signal representative of the number of said increments, means for decreasing the value of the stored increment signal by one increment as each increment is read from tape, means for storing a record signal representative of the number of records in each increment at the beginning of each increment read from tape, means for decreasing the value of the stored record signal by one record as each record is read from tape, means for monitoring the signals provided by the reading means and for detecting an error in the signals, means for storing an error signal representing no errors at the beginning of each increment read from tape and for modifying the stored error signal at at least some of the detected errors so as to represent the number of detected errors, means for comparing the error signal with a signal representing a preselected maximum error when the modified and stored record signal is zero and for forming an output signal when the error signal exceeds the maximum error, and means for storing a signal representing the value of the stored increment signal including means for causing such storage following the occurrence of said output signal thereby causing a signal representing the increment of failure to be stored.

11. In a data processing system arranged for testing magnetic tape reading means, the combination, comprising: an elongated magnetic test tape having a series of increments, each increment having a series of records having a series of indicia, said indicia being distributed along the length of the tape and sequentially degraded a predetermined amount from increment to increment in said series of increments and the indicia within the records of each increment being of the same degraded value; magnetic tape reading means arranged for serially reading the indicia on said tape; increment tally means including register, means for storing an increment signal in the register means corresponding to the number of increments in a file and means arranged for decreasing the stored increment signal by one increment for each increment of indicia read from tape; means responsive to the indicia read from tape for detecting an arror therein; means for selectively storing an error signal corresponding to the maximum number of permissible errors in an increment; error tally means comprising a register, means for storing an error signal representing no errors in the tally register at the beginning of each increment, and means arranged in response to each detected error signal for increasing the error signal in the error register by one; means for comparing the stored error signal in the error tally means with the signal contained in the maximum error storing means and for forming an indication when the value of the stored error signal is in a predetermined relationship to the stored maximum error signal; and means including a storage device and means for storing the increment signal contained in the increment tally means into the storage device after the occurrence of the comparing means forming an indication thereby causing an indication of the level of degradation at which the reading means fails to be stored.

12. In a data processing system arranged for testing magnetic tape reading means, the combination, comprising: an elongated magnetic test tape having magnetically recorded indicia thereon and arranged in a series of increments, each increment having a series of records having a series of indicia, said indicia being distributed along the length of the tape and sequentially degraded a predetermined amount from increment to increment in said series of increments and the indicia within the records of each increment being of the same degraded value and having a predetermined parity check indicia; magnetic tape reading means arranged for serially reading the indicia on tape; increment tally means including a register, means for storing an increment signal in the register corresponding to the number of said increments and means arranged for decreasing the stored increment signal by one increment of indicia as each increment is read from tape; parity check circuit means responsive to the indicia read from tape for detecting a parity error therein, means for selectively storing a parity error signal corresponding to the maximum number of permissible errors in an increment; error tally means comprising a register, means for storing an error signal in the tally register representing no errors at the beginning of each increment, and means arranged in response to the detected error signal for increasing the error signal in the error register by one; means for comparing the error signal stored in the error tally means with the signal contained in the maximum error storing means and for forming an output signal when the value of the stored error signal is in a predetermined relationship to the stored maximum error signal; and means including a storage device and means for storing the increment signal contained in the increment tally means into the storage device when the comparing means forms an output signal thereby causing an indication of the level of degradation at which the reading means fails to be stored.

13. In a data processing system arranged for testing magnetic tape reading means, the combination comprising: an elongated magnetic test tape having magnetically recorded indicia thereon arranged in files, each file having a series of increments and each increment having a series of records having a series of indicia, said indicia being distributed along the length of the tape and sequentially degraded a predetermined amount from increment to increment in said series of increments and the indicia within the records of each increment being of the same degraded value and having a perdetermined parity check indicia, each of said files having a different type of degradation of the magnetically recorded indicia therein; magnetic tape reading means arranged for serially reading the indicia on said tape; increment tally means including a register, means for storing an increment signal in the register corresponding to the number of increments in a file and means arranged for decreasing the stored increment signal by one increment as each increment is read from tape; record tally means including a register, means for selectively storing a record signal in the record tally register corresponding to the number of records in an increment at the beginning of the reading of each increment and means arranged for decreasing the stored record signal by one record as each record is read from tape; parity check circuit means responsive to the indicia read from tape for detecting a parity error therein; means for selectively storing a parity error signal representing the maximum number of permissible errors in an increment; error tally means comprising a register, means for storing an error signal in the tally register representing no errors at the beginning of each increment, and means arranged in response to the detected error signal for increasing the error signal in the error register by one; means for detecting when the stored record signal is decreased to zero; means responsive to the detection of a zero record signal for comparing the stored error signal in the error tally means with the signal contained in the maximum error storing means and for forming an output signal when the stored error signal exceeds the stored maximum error signal; and means including a storage device and means for storing the increment signal contained in the increment tally means into the storage device when the comparing means forms an output signal thereby causing an indication of the level of degradation at which the reading means fails to be stored.

14. Test apparatus for magnetic tape reading means, the combination comprising: an elongated magnetic test tape having magnetically recorded indicia thereon arranged in files, each file having a series of increments and each increment having a series of records having a series of indicia, said indicia being distributed along the length of the tape and sequentially degraded a predetermined amount from increment to increment in said series of increments and the indicia within the records of each increment being of the same degraded value, each of said files having a different type of degradation of the magnetically recorded indicia therein; magnetic tape reading means arranged for serially reading the indicia on said tape; increment tally means including a register, means for storing an increment signal in the register corresponding to the number of increments in a file and means arranged for decreasing the stored increment signal by one increment as each increment is read from tape; record tally means including a register, means for selectively storing a record signal in the record tally register corresponding to the number of records in an increment at the beginning of the reading of each increment and means arranged for decreasing the stored record signal by one record as each record is read from tape; means responsive to the indicia read from tape for detecting an error therein; means for selectively storing an error signal corresponding to the maximum number of permissible errors in an increment; error tally means comprising a register, means for storing an error signal in the tally register representing no errors at the beginning of each increment of indicia read; and means arranged in response to each detected error signal for increasing the error signal in the error register by one; means for detecting when the stored record signal is decreased to zero; means responsive to the detection of a zero record signal for comparing the stored error signal in the error tally means with the signal contained in the maximum error storing means and for forming an output signal when the stored error signal exceeds the stored maximum error signal; and means including a storage device and means for storing the increment signal contained in the increment tally means into the storage device when the comparing means forms an output signal thereby causing an indication of the level of degradation at which the reading means fails to be stored.

15. A method of determining the point of failure of a magnetic tape reading means using a magnetic test tape having a series of increments and each increment having a series of records having a series of indicia, said indicia being distributed along the length of the tape and sequentially degraded a predetermined amount from increment to increment in said series of increments and the indicia within the records of each increment being of the same degraded value including the steps of serially reading the increments from tape, and providing signals corresponding to those read from tape, storing a digital increment signal representative of the number of said increments, decreasing the value of the stored increment signal by one increment as each increment is read from tape, storing a record signal representative of the number of records in each increment at the beginning of each increment, decreasing the value of the stored record signal by one record as each record is read from tape, monitoring the signals provided in the step of reading and detecting an error in the signals, storing an error signal representing no errors at the beginning of each increment and modifying the stored error signal with each detected error so as to represent the number of detected errors, comparing the error signal with a signal representing a preselected maximum error and forming an output signal when the error signal exceeds the maximum error, and storing a signal representing the value of the stored increment signal when the modified and stored record signal is zero and said output signal occurs thereby causing a signal representing the increment of failure to be stored.

16. A method for determining the point of failure of apparatus which reads indicia and provides corresponding digital output signals to digital data processing means and using a test record member for the reading apparatus, the test record member having serially readable indicia thereon which are serially degraded in readability in increments from indicia which can, to indicia which cannot, be read by the reading apparatus, the steps comprising: placing the test record member in a reading position on the reading apparatus and causing the indicia to be serially read and provided as digital output signals corresponding to the indicia read until indicia is reached which cannot be read, and controlling the data processing means causing the same to monitor the digital signals and detect a predetermined error therein indicating a failure in reading by the reading apparatus.

17. A method according to claim 16 including the additional step of controlling the data processing means to determine the level of degradation of the indicia at which failure of the reading apparatus occurs.

18. A method according to claim 16 wherein the test record member has indicia arranged into rows and columns and each row being coded with a predetermined parity, a row of indicia being read substantially simultaneously at a time, the step of monitoring including the step of monitoring the digital output signals for an error in parity.

19. A method according to claim 16 wherein the test record member has indicia arranged into rows and columns for reading a row at a time substanially simultaneously, a selected number of rows of indicia having a predetermined parity in all column positions, the step of monitoring including the step of monitoring the digital output signals for an error in column parity.

20. A method according to claim 19 wherein each row is also coded with a predetermined parity, the step of monitoring including the step of monitoring the digital output signals for an error in row parity as well as column parity.

21. A method for determining the point of failure of reading apparatus providing digital output signals to digital data processing means and using a test record member for the reading apparatus, the test record member having serially readable indicia thereon, wherein the indicia are arranged into a series of increments containing indicia which are systematically degraded in readability from increment to increment, the steps comprising: placing the test record in a reading position on the reading apparatus and causing the indicia to be read and the reading apparatus to provide digital output signals corresponding to the indicia read and controlling the data processing means causing the same to monitor the signals from the reading apparatus and form a unique indication corresponding to each increment and further to detect an error in the signals indicating a failure in the reading apparatus and in response thereto store the indication corresponding to the increment in which the failure occurred.

22. A method according to claim 21 wherein the increments are arranged into records of indicia and the indicia within the records of each increment are of the same degraded value, comprising the additional steps of: controlling the data processing means causing the same to count the number of records within one increment in which an error in the signals occur and to store the indication for an increment in which the number of records counted exceed a predetermined number.

23. A method for determining the point of failure of a reading apparatus providing digital output signals corresponding to that which is read using a test record member for the reading apparatus, the test record member having serially readable indicia thereon which is systematically degraded in readability, the steps comprising: placing the test record member in a reading position on the reading apparatus and causing the indicia to be read and the reading apparatus to provide digital output signals corresponding to the indicia read, monitoring the signals from the reading apparatus for errors therein, counting the number of errors occurring within one increment of indicia and providing an indication when the number of errors within one increment exceed a predetermined amount.

24. A method for determining the point of failure of a multiple channel reading apparatus which provides digital output signals to digital data processing means using a test record member for the reading apparatus, the test record member having a plurality of serially readable rows each with a plurality of indicia therein corresponding to the channels in the reading apparatus, the rows of indicia being systematically degraded in readability and each row being coded with a predetermined parity, the steps comprising: placing the test record member in a reading position on the reading apparatus and causing the indicia to be read row by row by the reading apparatus to provide multiple channel digital output signals corresponding to each row of indicia which is read and controlling the data processing means causing the same to monitor the parity of the multiple channel digital signals and detect an error in parity indicating a failure in reading by the reading apparatus.

25. A method according to claim 24 including the additional step of controlling the data processing means to determine the level of degradation of the indicia at which failure of the reading apparatus occurs.

26. A method according to claim 25 wherein the rows of indicia are arranged into increments each having plurality of rows of indicia and wherein the step of determining the level of degradation includes the step of counting the increments to form an indication of the increment being read and an indication of the level of degradation.

27. A test record member for testing a multichannel digital reading apparatus for marginal operating condition, comprising: an elongated member having indicia thereon which are readable by the reading apparatus and are arranged into transverse rows and longitudinal columns along said elongated member, the columns corresponding to the channels of the reading apparatus, the indicia being arranged into a series of increments along the length of the elongated member, each increment having a plurality or rows of indicia therein and the indicia being serially and systematically degraded in readability between rows from one end of said rows of indicia to the other.

28. A test tape according to claim 27 wherein said increments include a plurality of separate records of indicia each record having a plurality of indicia, the indicia in the records of each of said increments being of the same degraded value.

29. A test record member according to claim 27 wherein the indicia are serially degraded in value from one increment to the next but the indicia within each increment is of the same degraded value.

30. A test record member according to claim 27 wherein the increments of indicia are arranged into files comprising a plurality of increments, said files having different types of degradation of the indicia.

31. A test record member according to claim 29 wherein said indicia is degraded by decreasing the intensity of the recorded signal.

32. A test record member according to claim 29 wherein said indicia is degraded by displacing one or more of the indicia within each row a predetermned amount with respect to other indicia in the corresponding row.

33. A test record member according to claim 29 wherein there is a gap in the indicia between increments and wherein the gaps vary in width.

34. A test record member according to claim 27 wherein the indicia on the record member is degraded from indicia which can be read by such reading apparatus to indicia which cannot.

35. A test record member for testing a multichannel digital reading apparatus for marginal operating condition, comprising: an elongated member having indicia thereon which are readable by the reading apparatus and are arranged into transverse rows and longitudinal columns along said elongated member, the columns corresponding to the channels of the reading apparatus, the indicia being arranged into a series of increments along the length of the elongated member, each increment having a plurality of rows of indicia therein and the indicia therein and the indicia being serially and systematically degraded in readability between rows from one end of said rows of indicia to the other, the indicia being coded according to a predetermined parity.

36. A test record member according to claim 35 wherein the rows of indicia have a predetermined parity.

37. A test record member according to claim 35 wherein the columns are arranged into groups of indicia each having a predetermined parity.

38. Apparatus for determining the point of failure of digital reading apparatus, comprising: a test record member having serially readable indicia thereon, digital reading apparatus for serially reading said record member indicia and for providing corresponding digital output signals, the record member indicia being serially degraded in readability in increments from indicia which can be read to indicia which cannot be read by the reading apparatus, and data processing means coupled to such reading apparatus for monitoring the signals therefrom and for determining the level of degradation at which failure of reading occurs.

39. Apparatus according to claim 38 wherein the indicia is coded according to a predetermined parity and including a parity detect circuit for detecting an error in parity of the digital signals and for providing a predetermined signal to said data processing means causing the same to store a signal corresponding to the level of degradation at which such error occurred.

40. Apparatus for determining the point of failure of digital reading apparatus, comprising: a test record member having serially readable indicia thereon, digital reading apparatus for serially reading said record member indicia and for providing corresponding digital output signals, the record member indicia being serially degraded in readability in increments from indicia which can to indicia which cannot be read by the reading apparatus, and data processing means coupled to such reading apparatus for monitoring the signals therefrom and for detecting an error in reading.

41. Apparatus for determining the point of failure of digital reading apparatus, comprising: a test record member having serially readable indicia thereon, the record member indicia being arranged into transverse rows and longitudinal columns along said member, multichannel digital reading apparatus having a transducer for each column for serially reading said record member indicia a row at a time and for providing corresponding output signals, the record member being serially degraded in readability in increments from indicia which can to indicia which cannot be read by the reading apparatus, and data processing means coupled to such reading apparatus for monitoring the signals therefrom and for determining when failure of reading occurs.

42. Apparatus for determining the point of failure of digital reading apparatus, comprising: a test record member having serially readable indicia thereon, the indicia having a predetermined parity, multichannel digital reading apparatus having a transducer for each column for serially reading said record member indicia a row at a time and for providing corresponding output signals, the record member indicia being arranged into transverse rows and longitudinal columns along said member and being serially and systematically degraded in readability from indicia which can to indicia which cannot be read by the reading apparatus, and data processing means coupled to such reading apparatus for monitoring the parity of the signals therefrom for detecting an error in parity when failure of reading occurs.

References Cited

UNITED STATES PATENTS

| | | | |
|---|---|---|---|
| 2,690,299 | 9/1954 | Kille | 340—146.1 X |
| 2,920,818 | 1/1960 | Taylor et al. | 324—73 X |
| 3,168,697 | 2/1965 | Humphrey | 324—73 |
| 3,219,927 | 11/1965 | Topp et al. | 324—73 |

OTHER REFERENCES

Comerci, Wilpon, and Schwartz: Navy Standardization of ¼ Inch Magnetic Tape and Recorder Reproducers, Iretransactions—Prof. group on audio, vol. AV–2, No. 5, September-October 1953, TK5981 I2, pp. 146–153.

Gayford: Acoustical Techniques and Transducers, MacDonald and Evan Ltd., 1961, TK5981 G38, pp. 278–281.

Spratt: Magnetic Tape Recording, Heywood and Co. Limited, 1958, TK5981 S75, pp. 229–233.

MALCOLM A. MORRISON, Primary Examiner

C. E. ATKINSON, Assistant Examiner

U.S. Cl. X.R.

179—100.2; 324—73; 340—146.1

PO-1050
(5/69)

UNITED STATES PATENT OFFICE
CERTIFICATE OF CORRECTION

Patent No. 3,506,814                           Dated    April 14, 1970

Inventor(s)   D.N. MacDonald et al        Page 1

Figure 11:
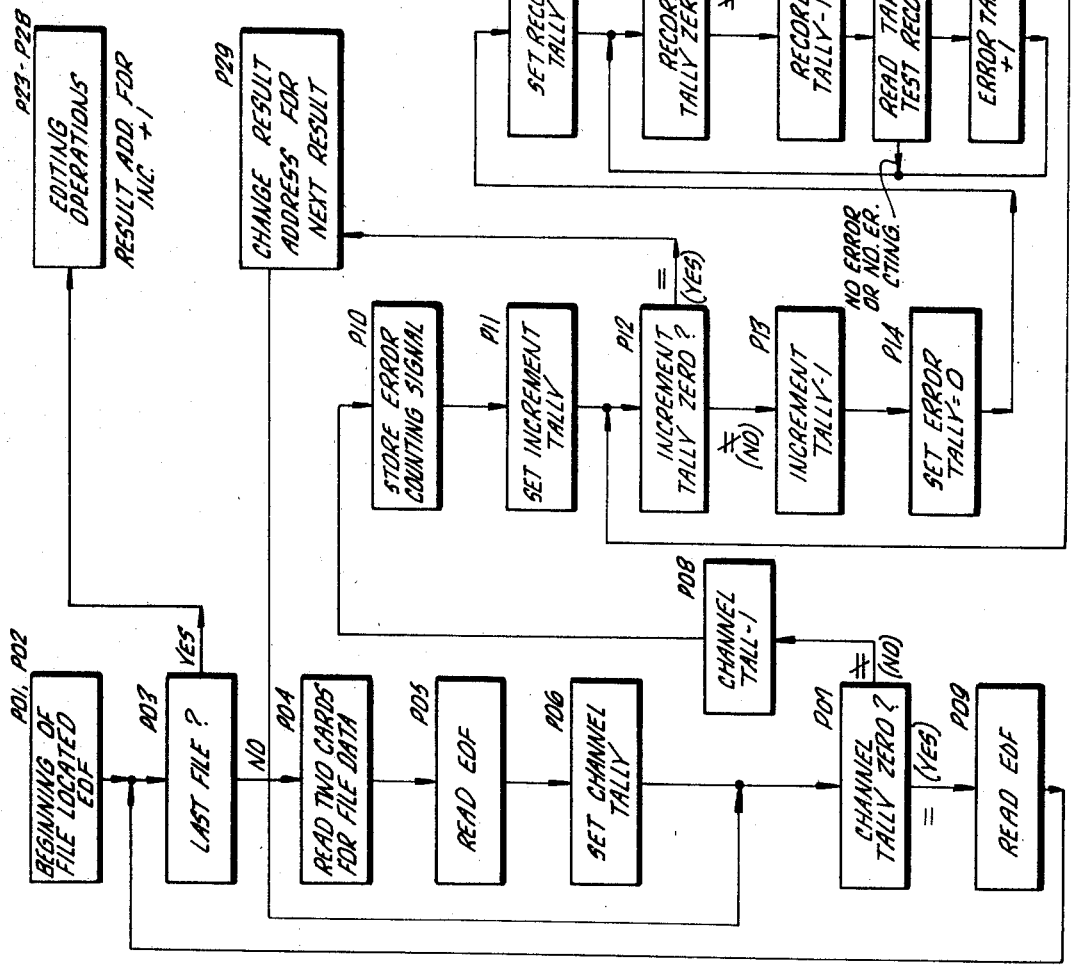
FIG. 11 is a graph illustrating the length of the interrecord test gap in each increment of FIG. 10 in the test file #6.

It is certified that error appears in the above-identified patent and that said Letters Patent are hereby corrected as shown below:

Col. 7, lines 44 and 45, "twenty" should read -two hundred-;
Col. 8, line 16, "FIG. 12" should read --FIG. 11--;
Col. 11, line 7, "1" should read --0--;
Col. 12, line 18, "114" should read --14--; and "127" should read --126--;
Col. 12, line 19, "127" should read --126--; "126" should read --127--;
Col. 12, line 24, "126" should read --127--;
Col. 12, line 25, "127" should read --126--;
Col. 12, line 29, "114" should read --14--;
Col. 12, line 33, "126" should read --127--;
Col. 12, line 34, "127" should read --126--;
Col. 12, line 42, "127" should read --126--;
Col. 12, line 56, delete "not";
Col. 12, line 67, "172" should read --1720--;
Col. 12, line 69, "172" should read --1720--
Col. 12, line 73, "OR" should read --AND--;
Col. 13, lines 1 and 3, "171" should read --172--;
Col. 13, line 9, "172" should read --1720--;
Col. 14, lines 47 and 49, "AND" should read --OR--;
Col. 14, line 49, "124" should read --214--;
Col. 14, line 51, "126" should read --216--;
Col. 16, line 69, "FIG. 12" should read --FIG. 17--;
Col. 17, line 65, "BIF" should read --AIF--;
Col. 19, line 38, "P11" should read --P14--;
Col. 19, line 64, "FIG. 14" should read --FIG. 13--;
Col. 19, line 70, "P16" should read --P17--
Col. 20, lines 14 and 28, "127" should read --126--;
Col. 20, lines 15, 17, 29 and 31, "126" should read --127--;
Col. 20, lines 17 and 31, "127" should read --126--;
Col. 20, line 20, "171" should read --172--;
Col. 20, lines 21, 35 and 38, "172" should read --1720--;
Col. 20, line 25, "165" should read --155--; Col. 20, line 55, "FIG. 13" should read --FIG. 12--; Col. 21, line 35, "address 113" should read --addresses (016) and (018)--.

PO-1050
(5/69)

UNITED STATES PATENT OFFICE
CERTIFICATE OF CORRECTION

Patent No. 3,506,814      Dated April 14, 1970

Inventor(s)    D.N. MacDonald et al     Page 2

It is certified that error appears in the above-identified patent and that said Letters Patent are hereby corrected as shown below:

FIG. 14, "CKTS 114" should read --CKTS 14--;
"AIF-127" should read --AIF-126--;
"BIF-126" should read --BIF-127--;
"Gate 172" should read --Gate 1720--.

PO-1050
(5/69)

UNITED STATES PATENT OFFICE
CERTIFICATE OF CORRECTION

Patent No. 3,506,814      Dated April 14, 1970

Inventor(s) D.N. MacDonald et al    Page 3

It is certified that error appears in the above-identified patent and that said Letters Patent are hereby corrected as shown below:

Col. 6, line 50, "displayed" should read --displaced--;
Col. 9, Table VII, "915" should read --195--;
Col. 9, Table VII, (under T.F.#1 column) "4" should read --5--;
Col. 9, Table VII, (under T.F.#2 column) "09" should read --0--;
Col. 11, line 10, "146" should read --147--;
Col. 11, line 61, "circuits" should read --circuit--;
Col. 15, line 19, "cuitcuit" should read --cuit--;
Col. 15, line 54, delete "test" (second occurrence);
Col. 17, lines 67 and 72, "$\neq$" should read -- $\neq$ --;
Col. 27, line 49, "In a data processsing system arranged for testing" should read --Test apparatus for--;
Col. 28, lines 10 and 47, "In a data processing system arranged for testing" should read --Test apparatus for--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents